US012035430B2

(12) United States Patent
Upton et al.

(10) Patent No.: US 12,035,430 B2
(45) Date of Patent: Jul. 9, 2024

(54) CENTRALLY-CONTROLLED TUNABLE LIGHTING

(71) Applicant: Mate. LLC, Oklahoma City, OK (US)

(72) Inventors: Jon Daniel Upton, Oklahoma City, OK (US); Jennifer Upton, Oklahoma City, OK (US); Christian Ratcliffe, Tuttle, OK (US); Brandon E. Lambert, Oklahoma City, OK (US); John Christopher Gowin, Oklahoma City, OK (US); Elton Lee Ledbetter, Moore, OK (US); Christopher Andrew Merts, Blanchard, OK (US)

( * ) Notice: Subject to any disclaimer, the term of this patent is extended or adjusted under 35 U.S.C. 154(b) by 510 days.

(21) Appl. No.: 17/302,973

(22) Filed: May 17, 2021

(65) Prior Publication Data

US 2021/0360755 A1 Nov. 18, 2021

Related U.S. Application Data

(60) Provisional application No. 63/026,304, filed on May 18, 2020.

(51) Int. Cl.
*H05B 45/20* (2020.01)
*H05B 47/11* (2020.01)
*H05B 47/165* (2020.01)
*H05B 47/19* (2020.01)

(52) U.S. Cl.
CPC ............. *H05B 45/20* (2020.01); *H05B 47/11* (2020.01); *H05B 47/165* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 7,348,949 | B2 | 3/2008 | Lee et al. |
| 7,687,753 | B2 | 3/2010 | Ashdown |
| 8,299,987 | B2 | 10/2012 | Neudorf et al. |
| 8,330,373 | B2 | 12/2012 | Ramer et al. |
| 8,337,031 | B2 | 12/2012 | Wegh et al. |

(Continued)

FOREIGN PATENT DOCUMENTS

| | | |
|---|---|---|
| CA | 2913239 A1 | 12/2014 |
| WO | 2010031169 A1 | 3/2010 |

(Continued)

*Primary Examiner* — Anh Q Tran
(74) *Attorney, Agent, or Firm* — Young's Patent Services; Bruce A. Young

(57) ABSTRACT

A correlated color temperature (CCT) of one or more luminaires is controlled by obtaining a target CCT for the one or more luminaires and obtaining a first profile associated with a first luminaire of the one or more luminaires. A first target power for a first direct-current (DC) power input of the first luminaire and a second target power for a second DC power input of the first luminaire are calculated based on the target CCT and the first profile so that the first target power and the second target power drive the first luminaire to emit light at the target CCT. A first DC power supply is controlled to deliver the first target power to the first DC power input of the first luminaire and a second DC power supply is controlled to deliver the second target power to the second DC power input of the first luminaire.

38 Claims, 7 Drawing Sheets

(56) References Cited

U.S. PATENT DOCUMENTS

| | | |
|---|---|---|
| 8,517,550 B2 | 8/2013 | Ramer et al. |
| 8,525,446 B2 | 9/2013 | Tikkanen et al. |
| 8,866,414 B2 | 10/2014 | Maxik et al. |
| 8,926,133 B2 | 1/2015 | Booth |
| 8,957,601 B2 | 2/2015 | Tikkanen et al. |
| 9,039,230 B2 | 5/2015 | Crimi et al. |
| 9,041,379 B2 | 5/2015 | Lyons |
| 9,049,759 B2 | 6/2015 | Tikkanen et al. |
| 9,055,622 B2 | 6/2015 | Aldrich et al. |
| 9,078,310 B2 | 7/2015 | Tikkanen et al. |
| 9,320,093 B2 | 4/2016 | Tikkanen et al. |
| 9,410,664 B2 | 8/2016 | Krames et al. |
| 9,433,053 B2 | 8/2016 | Neudorf |
| 9,591,713 B2 | 3/2017 | Tikkanen et al. |
| 9,662,409 B2 | 5/2017 | Rains, Jr. et al. |
| 9,775,207 B2 | 9/2017 | Tikkanen et al. |
| 9,942,954 B2 | 4/2018 | Neudorf et al. |
| 10,045,421 B2 | 8/2018 | Tikkanen et al. |
| 10,076,016 B2 | 9/2018 | Tikkanen et al. |
| 10,187,946 B2 | 1/2019 | Tikkanen et al. |
| 10,237,945 B2 | 3/2019 | Sooch et al. |
| 10,299,441 B2 | 5/2019 | Elmpt et al. |
| 10,362,655 B2 | 7/2019 | Heim et al. |
| 10,368,811 B1 | 8/2019 | Bajaj et al. |
| 10,582,596 B2 | 3/2020 | Sooch et al. |
| 10,621,836 B2 | 4/2020 | Sooch et al. |
| 10,757,791 B1 | 8/2020 | Jonsson |
| 2006/0125770 A1 | 6/2006 | Kao et al. |
| 2008/0251690 A1 | 10/2008 | Keiper et al. |
| 2011/0204820 A1 | 8/2011 | Tikkanen et al. |
| 2012/0119658 A1 | 5/2012 | McDaniel |
| 2013/0018522 A1* | 1/2013 | Nuhfer .................. H05B 45/44 700/297 |
| 2013/0093362 A1 | 4/2013 | Edwards |
| 2013/0218030 A1 | 8/2013 | Barroso et al. |
| 2016/0128144 A1 | 5/2016 | Tikkanen et al. |
| 2016/0158486 A1 | 6/2016 | Colbaugh et al. |
| 2016/0227616 A1 | 8/2016 | Lee |
| 2016/0262221 A1* | 9/2016 | Nishioka ................ G01R 31/44 |
| 2017/0025028 A1 | 1/2017 | Hrushesky |
| 2017/0105265 A1 | 4/2017 | Sadwick |
| 2017/0127497 A1 | 5/2017 | Baek et al. |
| 2017/0132946 A1 | 5/2017 | Kinnunen et al. |
| 2017/0332462 A1 | 11/2017 | Tikkanen |
| 2018/0318602 A1 | 11/2018 | Ciccarelli et al. |
| 2019/0183415 A1 | 6/2019 | Rytky et al. |
| 2019/0216391 A1 | 7/2019 | Kenyon et al. |
| 2019/0279482 A1 | 9/2019 | Kaplan et al. |
| 2020/0068680 A1 | 2/2020 | Neudorf et al. |

FOREIGN PATENT DOCUMENTS

| | | |
|---|---|---|
| WO | 2016067028 A2 | 5/2016 |
| WO | 2018220087 A1 | 12/2018 |
| WO | 2019141904 A1 | 7/2019 |
| WO | 2020082178 A1 | 4/2020 |

* cited by examiner

CENTRALLY-CONTROLLED TUNABLE LIGHTING

CROSS-REFERENCE TO RELATED APPLICATIONS

This application claims the benefit of U.S. Provisional Application 63/026,304 filed May 18, 2020 and entitled CENTRALLY CONTROLLED SYSTEMS AND METHODS FOR DIRECT-CURRENT TUNABLE LIGHTING, which is hereby incorporated by reference in its entirety herein for any and all purposes.

TECHNICAL FIELD

The present subject matter relates to centrally-controlled tunable lighting. More particularly the disclosure relates to central control of direct-current (DC) tunable solid-state lighting systems configured to match indoor lighting to particular times of the solar day.

BACKGROUND

Light sources may be classified by the color appearance of the light wavelengths they produce, which may be referred to as the correlated color temperature (or simply, color temperature) of the light wavelengths. The correlated color temperature (CCT) is a measure of how "cool" or "warm" the light wavelengths appear to the human eye and may be measured in degrees Kelvin (K, a unit of thermodynamic temperature, equal in magnitude to a degree Celsius but starting at absolute zero) or in micro reciprocal degrees. A "micro reciprocal degree", commonly referred to as a mired (M), is a unit of measurement used to express color temperature based on the following formula: $M=1,000,000/$(Color Temperature in Kelvins), so $100M=10000K$, $200M=5000K$, $300M=3333$ K, $400M=2500K$, and $500M=2000K$. Note that because there is a direct reciprocal relationship between K and M, either one can be used interchangeable to describe a light source.

The CCT of a light source may be technically defined as the temperature of an ideal black-body radiator that radiates light of a color comparable to that of the light source. Typically, the cooler the light wavelengths appear, the higher the CCT or the lower the mired value. The warmer the light wavelengths appear, the lower the CCT or a higher mired value.

As the sun appears to move across the sky, the CCT of sunlight reaching a person on the Earth changes incrementally from a warm orange light at sunrise to a cool blue light at solar noon and back to a warm orange light at sunset. The time of day of these events changes depending on the day of the year and the location of the observer on the Earth. For example, on Mar. 25, 2020, the sunrise in Oklahoma City, Oklahoma, USA was at 7:25 AM. Central Daylight Savings Time (CDT), solar noon occurred at 1:36 PM. CDT, and the sunset was at 7:47 PM. CDT. As an example of the change in time of these events based on the day, on Apr. 13, 2020, the first light in Oklahoma City, Oklahoma, USA, was at 6:31 AM. CDT, sunrise was at 6:58 AM CDT, solar noon occurred at 1:30 PM CDT, and the sunset was at 8:02 PM CDT. This information can be determined for every day based on calculation of the position of the sun and the Earth. The information may also be retrieved from one or more pre-calculated databases.

The changing CCT of daylight affects human circadian rhythms. The circadian system in animals and humans is near, but not exactly, 24-hours in cycle length, and must be reset daily to remain synchronized with external environmental time, a process known as entrainment. Entrainment is achieved in most mammals through regular exposure to contrast between light color and darkness.

Circadian rhythms control the sleep-wake cycle, affect alertness, and affect quality of sleep, among other physiological and behavioral factors. Exposure to light having a CCT differing from that of current daylight can have a negative impact on circadian rhythm, including changing the timing of the sleep-wake cycle, periods of alertness, and/or periods of drowsiness, for example. Further, exposure to certain wavelengths of light may be beneficial during daylight hours because the wavelengths may boost attention, reaction times, and mood, but may be detrimental and disruptive to sleep at night. Exposure of people to light at night can shift circadian rhythms and suppress the secretion of melatonin. Further, research shows that unbalanced circadian rhythms with shortened or disrupted sleep cycles may contribute to the causation of disease, by lessening the time for the body to heal itself.

Currently, most common commercially-available artificial light sources emit light having a fixed CCT, are rated to output a set brightness in lumens, and to use a particular amount of power in Watts (W). For example, a light fixture (or luminaire) may have a light emitting diode (LED) that produces light at 2700K (a warm, or orangish color), at a light output of 1550 lumens, and be rated to use 18 W of power when connected to an alternating current (AC) 120 V power source. However, a single-color light output greatly limits the lighting effects that can be accomplished and does not match the changing colors of daylight from the sun.

Some "smart" single-point lighting fixtures are available that include multiple light emitting diodes that have different colors of light output and a computer chip within the fixture that can control which LEDs receive power, and therefore, which LEDs produce light. Typically, these smart single-point lighting fixtures must be programmed individually. This individual programming, when multiplied across all smart single-point lighting fixtures in a structure (sometimes hundreds of fixtures), requires a significant amount of time and knowledge. Some smart single-point lighting fixtures may be programmed using a wireless retrofit connection, in that the smart single-point lighting fixtures are used in electrical sockets wired for AC and have wireless capability within the smart single-point lighting fixtures such that they can be programmed remotely, or remotely as a set of fixtures. However, a computer chip is still required within each individual smart single-point lighting fixture.

Additionally, each of the smart single-point lighting fixtures is electrically connected to an AC electrical power source. The AC power is converted to direct current (DC) power to drive the actual LEDs which results in excess heat that must be dissipated by the lighting fixture and can result in the premature failure of the smart single-point lighting fixture caused by failure of the computer chip through exposure to the heat. Often the computer chip fails in this way well before the LEDs fail. For example, the computer chip may fail while the LEDs still have one third to one half of their predicted life. Further, because of requirements for AC to DC electrical power conversion to power the smart single-point lighting fixtures, the smart single-point lighting fixtures are power inefficient up to 70% and thus multiple breakers may be required in an electrical panel to contain all of the electrical wiring for a building having smart single-point lighting fixtures. Also, the use of AC electrical power means that the amount of, or variation in, power delivered to the LEDs must be controlled at the fixture itself, not from a central location.

Systems also currently exist to control lighting systems from a DMX controller board, which is a computer circuit board or computer processor programmed in compliance with the Digital Multiplex (DMX) standard for digital communication networks, which is entitled "Entertainment Technology—USITT DMX512-A—Asynchronous Serial Digital Data Transmission Standard for Controlling Lighting Equipment and Accessories." The standard was originally developed in 1986 with the most recent revision approved by the American National Standards Institute (ANSI) in 2008 ("E1.11-2008, USITT DMX512-A"), but will be referred to herein as DMX, and it is understood that future revisions are contemplated. And while DMX may allow for sending control information to lighting fixtures, it does not address providing power, and thus many of the issues related to AC-powered single-point lighting fixtures, such as excess heat generation, may still be present in lighting systems using DMX.

For example, a DMX controller board may be used to control up to 512 functions (referred to as "channels") on a single network bus wired to an output connection of the DMX controller board. Each lighting fixture may include multiple functions (i.e., channels). For example, a lighting fixture including three light emitting diodes, each having a different color output, may have three channels (that is, one for each light emitting diode).

Traditionally, programming lighting systems using DMX has been complicated, difficult, and time-consuming, since the devices are programmed at the DMX controller board and/or at the light fixtures. The programming may be done in an analog manner (typically using a series of switches and buttons) or remotely. Such programming is usually done by audio-visual technicians having specific training in such systems. The programming is typically done after an electrician has installed the lighting fixtures and so also requires additional personnel and time.

In addition, current lighting systems are programmed without regard for, and without using or considering, external data factors. For example, a smart single-point fixture may be set for a cool-light output starting at six in the morning, without regard to actual external daylight conditions. As another example, a series of lighting fixture effects may be programmed with no consideration to matching external sunlight changes. Additionally, traditional user interfaces require programming languages that have been complex and difficult for installers, such as trade electricians, to learn and to implement. Often, only specially trained installers are able to navigate the traditional programming interfaces.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1A:
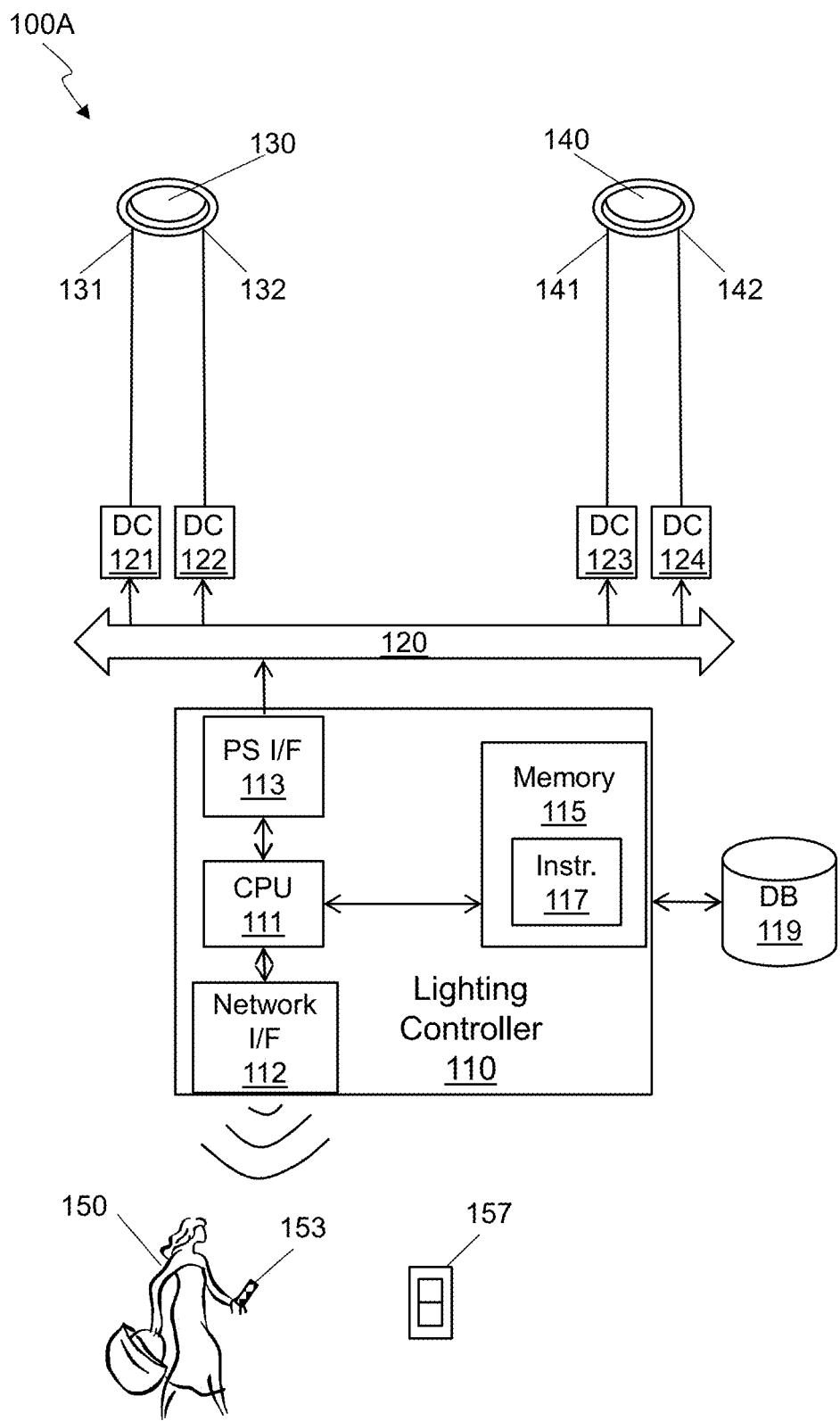
FIG. 1A shows a block diagram of an embodiment of a lighting system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

A solar event refers to a time, or range of times, that is based on a position of the sun (i.e. a solar position) at a particular location. Examples of solar events, include early morning, sunrise, mid-morning, solar noon, afternoon, sunset, evening, astronomical dawn, astronomical twilight, astronomical dusk, nautical dawn, nautical twilight, nautical dusk, civil dawn, civil twilight, civil dusk, night, and daylight. Other solar events may be defined in some embodiments.

The solar event "early morning" may be defined as a predetermined time period from a time before sunrise up until sunrise. In one embodiment, early morning may be, for example, a twilight period of time in which sunlight reaches the earth but before sunrise at a geographic location. In one embodiment, early morning may be a chosen artificial twilight period of time, such as, for example, a time period for which a user is awake before sunrise or a predefined time set by the user.

The solar event "sunrise" may be defined as the time at which the upper edge of the sun becomes visible over the eastern horizon in the morning at a geographic location on a particular date. In one embodiment, sunrise may be defined as a range of time on either side of a moment of sunrise.

The solar event "mid-morning" may be defined as a predetermined time period starting after sunrise and lasting until solar noon at a geographic location on a particular date. In one embodiment, mid-morning may begin at a mid-point between the time of sunrise and the time of solar noon.

The solar event "solar noon" may be defined as the time when the sun passes the meridian of a geographic location and reaches its highest position in the sky at that geographic location on a particular date. In one embodiment, solar noon may be defined as a range of time on either side of the moment of solar noon.

The solar event "afternoon" may be defined as a predetermined time period starting after solar noon and lasting until sunset at a geographic location on a particular date. Afternoon may begin at a mid-point between the time of solar noon and the time of sunset.

The solar event "sunset" may be defined as the time at which the trailing edge of the sun stops being visible and disappears below the western horizon in the evening at a geographic location on a particular date. In one embodiment, sunset may be defined as a range of time on either side of a moment of sunset. The time between sunrise and solar noon may or may not be equal to the time between solar noon and sunset, depending on the geographic location and the time of year.

The solar event "evening" may be defined as a predetermined time period from sunset until a time after sunset. In one embodiment, evening may be, for example, a twilight period of time in which sunlight still reaches the earth but after sunset at a geographic location. In one embodiment, evening may be a chosen artificial twilight period of time, such as, for example, a time period for which a user is awake after sunset, or a predefined time set by the user.

In some embodiments, astronomical/nautical definitions of solar times may be used to describe solar events. Astronomical dawn and dusk may be defined as the time when the sun is 18 degrees below the horizon respectively in the morning and evening, nautical dawn and dusk as the time when the sun is 12 degrees below the horizon respectively in the morning and evening, and civil dawn and dusk as the time when the sun is 6 degrees below the horizon respectively in the morning and evening. Astronomical twilight is the time range when the sun is between 12 and 18 degrees below the horizon, nautical twilight is the time range when the sun is between 6 and 12 degrees below the horizon, and civil twilight is the time range when the sun is between 0 and 6 degrees below the horizon. Astronomical, nautical, and civil twilight can each occur both in the morning and the evening. Night may be defined as the time between astronomical dusk and astronomical dawn, between sunset and sunrise, or by some other combination of solar positions, depending on the embodiment. Likewise, daylight may be defined as the time between sunrise and sunset, or some other combination of solar positions, depending on the embodiment.

It will be understood that the predetermined solar events may be defined differently, depending on the embodiment. Additionally, a user may shift the actual time of the solar events to artificial times. For example, a user who may be traveling to a second geographical location in a second time zone may shift the solar events to match the second geographical location in the second time zone, while still residing at the first geographical location in the first time zone, in order to condition their body in preparation for the travel.

Tunable Lighting Systems

Conventionally, lighting systems were either single-color or required complex color-programming at the source of the fixture or in an analog manner. In accordance with the present disclosure, DC tunable lighting control allows for central power control and central command control for changing light output of light fixtures to match lighting scenes based on solar events or other conditions, such as by assigning CCT and/or brightness, which may be used to maintain and/or correct circadian rhythms. Further, the present disclosures reduce the complexity for users to set-up such systems by eliminating analog programming and providing user interfaces that provide automatic and/or simplified programming.

Some luminaires (i.e. light fixtures) may provide two DC power inputs that respectively drive light sources (e.g. LEDs) in the luminaire. Such light fixtures depend on external DC power supplies to drive the two DC power inputs. These external DC power supplies may be integrated into a single unit with multiple DC power outputs, or they may be separate devices each having a single DC power output, depending on the embodiment, although a single system may use some DC power supplies with multiple outputs, and others with a single DC power output. As referred to herein, a DC power supply refers to a portion of a device that has a separately controllable DC power output and may refer to an entire stand-alone device or may refer to a portion of a larger device with multiple functions and/or DC power outputs. Thus, a device having a single DC power output is referred to as a DC power supply, and a device having four separately controllable DC power outputs may be referred to as a first DC power supply, a second DC power supply, a third DC power supply, and a fourth DC power supply. A system according to the present disclosure includes at least one device acting as one or more DC power supplies is connected to a power source, such as an AC power source (e.g. a 120 VAC power output driven from the AC power grid), a battery, a generator, a solar panel, or any other type or combination of types of power sources.

In some embodiments, the DC power supply may provide a set voltage and vary the current based on the number of luminaires (and therefore the number of LEDs) being driven. This may be referred to as a constant voltage (CV) driver. When this approach is used, the luminaires are connected in parallel with each other and the voltage provided by the DC power supply is set based on the specifications of the luminaires. In other embodiments, the DC power supply may provide a set current and vary the voltage based on the number of luminaires (and therefore the number of LEDs) being driven. This may be referred to as a constant current (CC) driver. When this approach is used, the luminaires are connected in series and the current provided by the DC power supply is set based on the specifications of the luminaires. Such luminaires have a power output which can be connected to the next luminaire in the series and a terminator may be used to complete the circuit on the last luminaire in the series.

Brightness of an LED can be controlled by modulating the power delivered by the driver (i.e. the DC power supply) to the LED load. Because LEDs have a non-linear response to voltage, analog modulation of the voltage for dimming is not commonly used with a CV driver. To dim an LED load with a CV driver, the power is commonly modulated using pulse width modulation (PWM) or pulse density modulation (PDM), both of which affect the percentage of a given time period that the voltage is applied to the LED load which digitally modulates the power delivered. The time period is typically chosen to be short enough that most people cannot detect any flickering, such as 16 milliseconds (ms) or less, with the PWM or PDM modulation being performed for each time period. So, for example if a 25% brightness is desired, a PWM system may repeatedly turn the voltage on for 4 ms and then turn off the voltage for 12 ms before turning the voltage back on again and repeating. It should be noted that DC power, as the term is used herein, encompasses a PWM or PDM modulated signal, even if the voltage during the 'off' periods goes negative, as long as substantially all of the power transfer to the LEDs is during the 'on' periods of the PWM/PDM modulation.

While a CC driver can use PWM or PDM to modulate the power delivered to the LED load, a CC driver can dim the LED load by changing the DC current level delivered to the LED load, which is an analog modulation of the power delivered. This technique for dimming an LED has an advantage over PWM and PDM in that it eliminates high frequency flicker from the LEDs that can cause health issues such as migraines. Note that as the current is modulated, the voltage level may vary in a non-linear way due to the characteristics of LEDs.

The DC power supplies, as the phrase is used herein, can use any technique to vary the amount of power delivered at their outputs, including those described above of PWM or PDM with a constant voltage or by regulating (or modulating) the current in an analog manner. The DC power supplies have the ability to communicate with a controller through a communication interface. Any type of communications interface may be used, including, but not limited to, DMX, Ethernet®, Wi-Fi®, universal serial bus (USB), or optical communications.

The DC power supplies may be installed with their power outputs coupled to power inputs of one or more luminaires by any type of suitable electrical cable or conductor, including, Romex® NM cable, Ethernet cable (e.g. Cat5 or Cat6 cable), individual multi-stranded or solid insulated wires, a jacketed multi-conductor cable, or another type of cabling. The conductors used should have low-enough resistance to minimize the power lost in the cable (and heat generated) and be insulated to avoid short-circuits with other cables or metal structures. Appropriate regulations such as the Uniform Electrical Code should also be followed in the selection of the cable to use to connect the DC power supplies to the luminaires and in the installation of the lighting system.

Going back to the luminaires, in some embodiments, the first power input of the luminaire is used to drive as a first set of one or more LEDs having a first spectral characteristic (i.e. light having particular spectrum of output) having a first correlated color temperature (CCT) and the second power input of the luminaire is used to drive a second set of one or more LEDs having a second spectral characteristic having a second CCT.

The first set of LEDs in a luminaire may all be identical, such as all orange LEDs having a light output in a narrow spectral band at about 600 nanometers (nm) or all warm white LEDs using a phosphor to emit a broad spectrum of light output have a CCT of 2000K, or the first set of LEDs may be a mix of LEDs, such as a mix of red, green, and blue LEDs selected to emit a warm white output having a CCT of 2400K. Any mix of LEDs that when driven by an adequate amount of power through the first power input emits light with a CCT of less than about 4000K (i.e. >250M) can be used for the first set of LEDs in the luminaires although some embodiments may use a first set of LEDs that emit light at a CCT of about 2400 K or lower (417M or higher). The LEDs of the first set of LEDs may be referred to herein as "orange LEDs" even if they are actually some other type of LED, such as a red LED, a warm white LED, or a mix of LED types.

The second set of LEDs may all be identical, such as all blue LEDs having a light output in a narrow spectral band at about 480 nm or all cool white LEDs using a phosphor to emit a broad spectrum of light output have a CCT of 6500K, or the second set of LEDs may be a mix of LEDs, such as a mix of red, green, and blue LEDs selected to emit a cool white output having a CCT of 5000K. Any mix of LEDs that when driven by an adequate amount of power through the second power input emits light with a CCT of more than about 4000K (i.e. <250M) can be used for the second set of LEDs in the luminaires although some embodiments may use a second set of LEDs that emit light at a CCT of about 5000K or higher (i.e. 200M or lower). The LEDs of the second set of LEDs may be referred to herein as "blue LEDs" even if they are actually some other type of LED, such as a cool white LED or a mix of LED types.

Luminaires with a first set of LEDs emitting light with a first CCT driven by a first DC power input, and a second set of LEDs emitting light with a second CCT driven by a second DC power input may be referred to as tunable luminaires as their light output can be tuned to have a range of brightness and CCT depending on the relative power delivered to their two DC power inputs. Because the light output of an LED is non-linear with power, and different luminaires may use different types of LEDs, information about the characteristics of a particular luminaire may be useful in determining the power to provide to its two DC power inputs in order to achieve a particular target brightness and/or CCT of its light output. Such information may be provided in a profile for a particular luminaire or for a particular type of luminaire which may be identified, as a non-limiting example, by its manufacturer and model number. Profiles for a variety of different luminaires and/or types of luminaires may be predetermined by their manufacturer or by a third party and stored in a database, which may be accessible through the internet or distributed by some other method.

A lighting controller (which may also be referred to as a bridge controller or virtual bridge controller) may be used to control the lighting output of one or more luminaires. The lighting controller may be communicatively coupled to two or more DC power supplies which are then electrically connected to the two DC power inputs of one or more tunable luminaires as described above. The lighting controller may be configured to understand what DC power supplies it can control and what luminaires are coupled to the DC power supplies. This configuration may be automatically performed using standard or proprietary network discovery protocols, done manually by a user, or by a combination of automatic discovery and manual configuration.

The lighting controller may then obtain profiles for the luminaires that it is able to control. The profiles may be obtained automatically during the configuration process through retrieval from a database based on information received about the luminaires, or the profiles may be manually uploaded to the lighting controller by a person (e.g. a technician) configuring the system. The profiles provide information to the lighting controller about how much power should be provided to each DC power input of the luminaire in order to achieve a particular brightness and/or CCT for that luminaire.

At various times, the lighting controller may determine that the brightness and/or CCT for a set of (one or more) luminaires connected to a pair of DC power supplies should be changed. It can use the target brightness and/or target CCT, along with the profile for the luminaires, to determine an amount of power that the two DC power supplies should provide in order to achieve the target brightness and/or target CCT and then it can send commands to the two DC power supplies to set them to deliver the calculated power to the set of luminaires.

The lighting controller may transmit signals to the two DC power supplies indicative of one or more changes in settings to produce changes in the light output from the luminaires at different times throughout the day, which may be referred to as one or more scenes. The lighting controller may transmit signals indicative of commands to the DC power supplies to send power, stop sending power, or change the amount of power sent, to produce one or more scenes that produce multiple changes in the light output from the luminaires at different times throughout the day.

The lighting controller may convert signals indicative of one or more changes in settings of the DC power supplies to DMX before transmitting the signals to the DC power supplies. However, it will be understood that the lighting controller may utilize other communication standards over any type of medium (e.g. wired, radio frequency, optical, and the like) for communications with the DC power supplies. In one embodiment, the lighting controller may transmit signals using UDP (User Datagram Protocol) or TCP (Transmission Control Protocol) to communicate through a wired network such as Ethernet or a wireless network such as Wi-Fi to control the output of the DC power supplies and to send power, stop sending power, or change the amount of power sent, to produce one or more scenes that produce multiple changes in the light output from the DC tunable luminaires at different times throughout the day.

The change from a first scene, that is, a first CCT value and/or dimness/brightness for the light output of the luminaires, to a second scene, that is, a second CCT value and/or dimness/brightness for the light output of the luminaires, may be implemented as a step change or as a progressive change. A step change is an abrupt change that occurs from one moment to the next. A progressive change is a gradual change that takes place over time. In one embodiment, the gradual change is a series of small step changes between the beginning of the first scene and the beginning of the second scene.

For example, for the change from an "early morning" scene to a "sunrise" scene, the lighting controller may implement a step change from a 40% dim light output at a CCT having a value of 2000K to 100% brightness at 2600K at the minute of the time occurrence of sunrise. Alternatively, the lighting controller may implement a gradual change over a time period, for example 60 seconds, to change the brightness and CCT at a rate of 1% and 10K per second to make the same amount of change at the sunrise solar event. In another embodiment, the change may take place over the entire period between events, so if the early morning event occurs 60 minutes prior to the sunrise event, the lighting controller may change the brightness and CCT at a rate of 1% and 10K per minute to gradually change from 40% brightness at 2000K at the early morning event to 100% brightness at 2600K at sunrise.

The DC power supplies may receive the signal(s) indicative of the power changes and may send the indicated power to the first power input and second power input of the luminaires to produce the one or more scene. The luminaires then react by emitting the light output produced by the first LED(s) driven by the first DC power input and the second LED(s) driven by the second DC power input (either one of which may be turned off for some scenes) at the time(s) of the occurrence of the predetermined solar events and/or at predetermined times assigned for the predetermined solar events.

Reference now is made in detail to the examples illustrated in the accompanying drawings and discussed below.

FIG. 1A shows a block diagram of an embodiment of a lighting system 100A. The lighting system 100A includes one or more luminaires 130 each comprising a first LED having a first spectral characteristic driven by a first direct-current (DC) power input 131 and a second LED having a second spectral characteristic driven by a second DC power input 132. Embodiments of the luminaire 130 may have any number of LEDs coupled to each of the two DC power inputs 131, 132. The lighting system 100A also includes a first DC power supply 121, separate from the one or more luminaires 130, electrically coupled to the first DC power input 131 of the one or more luminaires 130 to drive the first LEDs of the one or more luminaires 130, and a second DC power supply 122, separate from the one or more luminaires 130, electrically coupled to the second DC power input 132 of the one or more luminaires 130 to drive the second LEDs of the one or more luminaires 130. The electrical coupling of the DC power supplies 121, 122 to the DC power inputs 131, 132 of the one or more luminaires 130 can be done with any type and number of electrical conductors and/or cables.

In some embodiments, the lighting system 100A may include a second luminaire 140 that has a third set of LEDs having a third spectral characteristic coupled to a first power input 141 of the second luminaire 140 and a fourth set of LEDs having a fourth spectral characteristic coupled to a second power input 142 of the second luminaire 140. The lighting system 100A may also include a third DC power supply 123 electrically coupled to the first DC power input 141 of the second luminaire 140 to drive the third LEDs of the second luminaire 140, and a fourth DC power supply 124 electrically coupled to the second DC power input 142 of the second luminaire 140 to drive the fourth LEDs of the second luminaire 140.

The lighting system 100A also includes a lighting controller 110, communicatively coupled to the first DC power supply 121 and the second DC power supply 122 and in some embodiments to the third DC power supply 123 and fourth DC power supply 124. The lighting controller 110 is separate from the one or more luminaires 130, 140 and the DC power supplies 121-124. The lighting controller 110 is communicatively coupled to the DC power supplies 121-124 by a communication channel 120. The communication channel 120 can be any appropriate set of unidirectional or bidirectional point-to-point communication links between the lighting controller 110 and the power supplies 121-124, including individual direct links to each power supply 121-124 from the lighting controller 110, a hierarchical tree connection channel such as USB, or a daisy-chained communication link such as DMX. The communication channel may also be a bus or network over a wired or wireless media such as, but not limited to, Ethernet, Wi-Fi, the internet, a mobile telephony network (e.g. a 3G/4G/5G network), and/or Bluetooth®.

The lighting controller 110 may be a dedicated device, purpose-built to be a lighting controller, which may be referred to as a bridge controller as it provides a bridge from a user to the DC power supplies 121-124 used to control the luminaires 130, 140. In some embodiments, the lighting controller 110 may utilize a general purpose computing device, such as a computer or a server, running software to implement the functionality of the lighting controller 110, which may be referred to as a virtual bridge controller. The lighting controller 110 may be located in the same building as the luminaires 130, 140 and be directly wired to the DC power supplies 121-124, but in some embodiments the lighting controller 110 may utilize a remote server, such as a cloud server, and communicate with the user 150 and the DC power supplies 121-124 over the internet.

The lighting controller 110 includes a processor 111 which can be any type of computing device, including, but not limited to, a 32-bit or 64-bit central processing unit (CPU) from Intel or AMD having one or more X86 architecture cores, an embedded ARM® architecture CPU with one or more cores, an 8-bit 8051 architecture processor core, a 32-bit Coldfire processor core, a RISC-V processor core, or any other processor core using any reduced instruction set computer (RISC) or complex instruction set computer (CISC) instruction set architecture having any instruction bit length. The processor 111 may also be implemented in a field-programmable gate array (FPGA) in some embodiments or using an application-specific integrated circuit (ASIC). The lighting controller includes one or more memory devices 115, such as a dynamic random-access memory (DRAM) and/or a non-volatile flash memory device, coupled to the processor 111, which can store instructions 117 for the processor 111 to perform any method disclosed herein.

The lighting controller 110 also includes a power supply control interface 113 and a network interface 112, each coupled to the processor 111. In some embodiments, the power supply control interface 113 and the network interface 112 may be one and the same (e.g. an Ethernet interface), but in other embodiments, they may be separate interfaces (e.g., a DMX interface for the power supply control interface 113 and a Wi-Fi interface for the network interface 112). The power supply control interface 113 provides an interface to the communication link 120 used for communication with the power supplies 121-124 while the network interface 112 provide an interface to connections used to communicate with control devices such as the remote control 153 and/or the wall switch 157, as well as other electronic devices which may be used to configure and/or control the lighting system 100A. The network interface 112 may also provide the lighting controller 110 with access to the internet. Note that the wall switch 157 might not be a traditional 120 VAC switch but may simply be a device which reports the position of a switch (e.g. open or closed, or a brightness level based on a slider or knob) to the lighting controller through the network interface 112 and may not directly control any current flow to the one or more luminaires 130, 140. In some embodiments the network interface 112 may be used to communicate with the database 119, but other embodiments of the lighting controller 110 may have a dedicated interface for the database 119, such as serial attached storage interface (SATA) or small-computer serial interface (SCSI). The power supply control interface 113 and the network interface 112 can be interfaces to any appropriate communications link, including, but not limited to, DMX, Ethernet, and Wi-Fi.

The lighting controller 110 is configured to obtain a target CCT for the one or more luminaires 130, 140 and obtain a profile for the luminaire 130. The target CCT may be obtained from a user 150 using a remote control 153, a pre-defined scene associated with a solar event or a time, or from any other source. Predefined scenes, solar events, and/or times, may be stored in the memory 115, in the database 119, in a cloud server accessible over the internet, or in any other location. The profile may be stored in memory 115 or may be obtained from a database 119 based on information about the luminaire, such as a model number. The database may be embedded in the lighting controller 110, may be local with a direct connection to the lighting controller 110, or may be remote, such as being hosted by a cloud server or a web server accessible to the lighting controller 110 over the internet. In other embodiments, the profile may be provided by a technician during a configuration of the lighting system 100A.

The lighting controller 110 is further configured to calculate a first target power for the first DC power input 131 of the luminaire 130 and a second target power for a second DC power input 132 of the luminaire 130 based on the target CCT and the profile. The first target power and the second target power are calculated to drive the luminaire 130 to emit light at the target CCT. The lighting controller 130 is also configured to control the first DC power supply 121 to deliver the first target power to the first DC power input 131 of the luminaire 130 and the second DC power supply 122 to deliver the second target power to the second DC power input 132 of the luminaire 130. The lighting controller 110 can control the DC power supplies 121, 122 by sending commands over the communication link 120 to the DC power supplies 121, 122.

In embodiments that include the second luminaire 140 driven by the third and fourth DC power supplies 123, 124, the lighting controller 110 is configured to obtain a second profile, different than the first profile, for the second luminaire 140 and to calculate a third target power for a first DC power input 141 of the second luminaire 140 and a fourth target power for a second DC power input 142 of the second luminaire 140 based on the target CCT and the second profile. The third target power and the fourth target power are calculated to drive the second luminaire 140 to emit light at the target CCT. Note that because the first luminaire 130 may have different characteristics than the second luminaire 140, the first and second target power may be different than the third and fourth target power but still allow both the first luminaire 130 and the second luminaire 140 to emit light at the target CCT and brightness. Once the third power target and the fourth power target have been calculated, the lighting controller 110 may be configured to control the third DC power supply 123 to deliver the third target power to the first DC power input 141 of the second luminaire 140 and a fourth DC power supply 124 to deliver the fourth target power to the second DC power input 142 of the second luminaire 140.

Figure 1B:
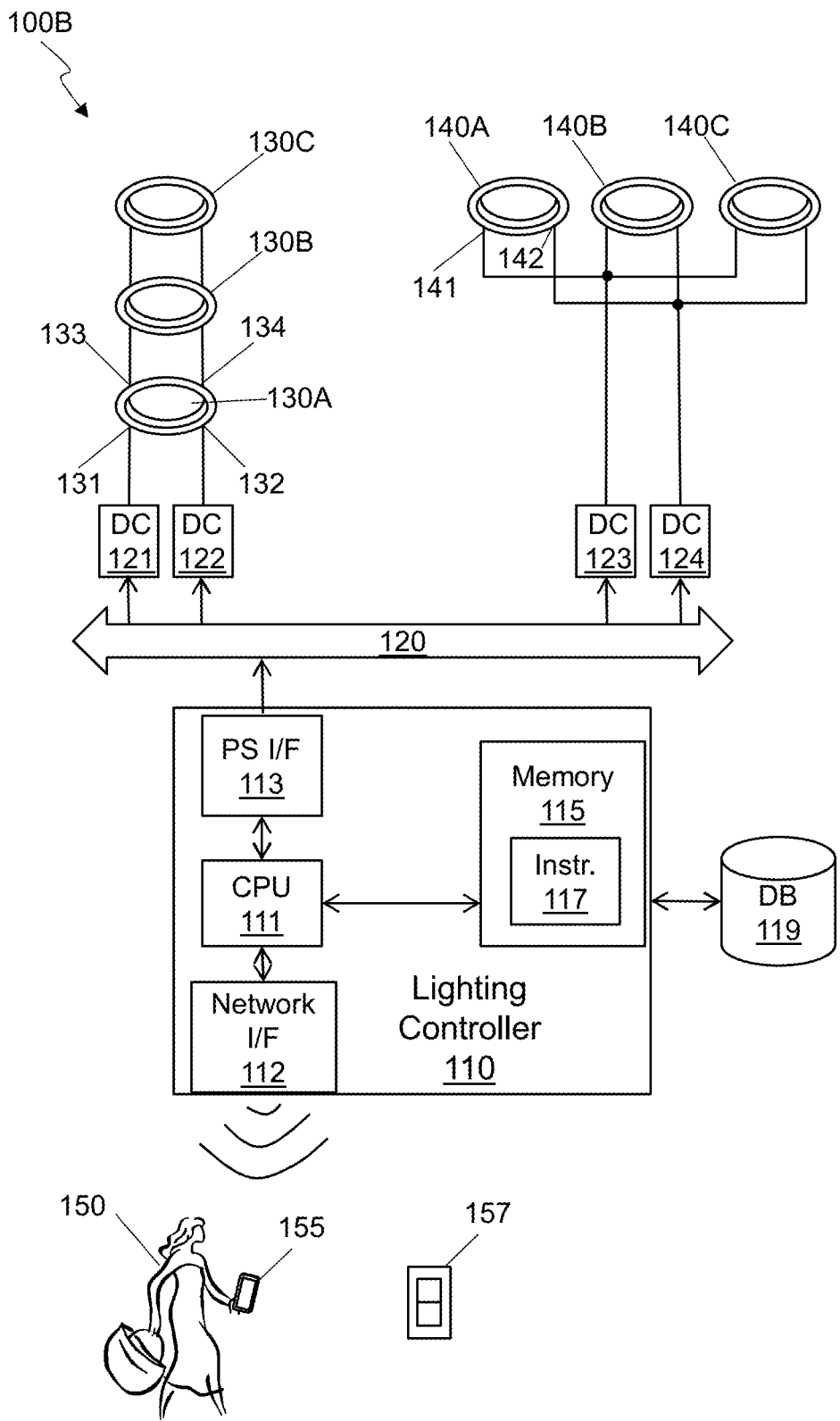
FIG. 1B shows a block diagram of an embodiment of an expanded lighting system.

FIG. 1B shows a block diagram of an embodiment of an expanded lighting system 100B. The expanded lighting system 100B includes the elements of the lighting system 100A but has additional luminaires added. In addition, the user 150 is shown holding a mobile electronic device 155 instead of a remote control 153, although the remote control 153 could be used with the expanded lighting system 100B and the mobile electronic device 155 could be used with the lighting system 100A. Elements described for lighting system 100A above are still relevant to the expanded lighting system 100B and descriptions of some elements may not be repeated here.

The expanded lighting system 100B includes the lighting controller 110 which includes a power supply control interface 113 configured to communicate with two or more power supplies 121-124, and a network interface 112, which may be one and the same as the power supply control interface 113 or may be a different network interface, that may be used for communication with a mobile electronic device 155 to allow the user 150 to configure and/or control the lighting system 100B. The lighting controller 110 also includes a processor 111 coupled to the power supply control interface 113, and one or more memory devices 115 coupled to the processor 111 and storing instructions 117 to program the processor 111 to perform one or more of the methods described herein.

In at least one embodiment, the instructions 117 program the processor 111 to perform a method that includes obtaining a target CCT for the one or more luminaires 130A/B/C, 140A/B/C. The target CCT may be obtained in any way, depending on the embodiment, including determining a solar position for a location of the one or more luminaires 130A/B/C, 140A/B/C and determining the target CCT based on the solar position, determining a clock time for a location of the one or more luminaires and determining the target CCT based on the clock time and the location, or receiving the CCT from a user control provided through a device such as the wireless remote control 153, mobile electronic device 155 with a graphical user interface, or wall switch 157. The target CCTs to be used for different time periods identified may have been previously set by the user 150 or by a technician at a time that the lighting system 100B was configured or may be obtained from a site manager or building manager through another electronic device in communication with the lighting controller 110. In addition to, or in place of, the target CCT, a user control may include a brightness setting and/or an on/off control.

In some embodiments, scenes may be predefined based on clock times or solar events that set a CCT and/or brightness level, with the scene used to obtain the target CCT. In some embodiments, those scenes may automatically control the luminaires 130A/B/C, 140 A/B/C to turn on at the specified CCT/brightness and/or turn off for the predefined scene, but in other embodiments, the scenes may set a default CCT and/or brightness for that period based on clock time and/or solar events for the location of the luminaires 130A/B/C, 140A/B/C and other factors are used to determine whether or not the luminaires 130A/B/C, 140A/B/C are off or are turned on at the specified CCT and/or brightness defined by the scene. So, the light switch 157 may be used to determine whether the first luminaires 130A/B/C and/or luminaires 140A/B/C are on or not, but when on, the CCT and/or brightness is controlled by the predefined scene. Scenes may also include setting for whether or not to override the current on/off, CCT, and/or brightness settings for a luminaire or set of luminaires 130A/B/C, 140A/B/C.

A first profile associated with a first luminaire 130A may also be obtained. This may be accomplished by obtaining a type identifier of the first luminaire 130A, such as, but not limited to, a model number, a serial number, a manufacturer, information received from the first luminaire over a digital communication link, information from an RFID tag, and/or information from a QR code, and retrieving the first profile from a database 119 storing a plurality of profiles based on the model number of the first luminaire 130A. The type identifier may be received directly from the first luminaire 130A using a network discovery protocol, received from the user 150 through their mobile electronic device 155, or obtained by some other mechanism. In some embodiments, the type information may be obtained through an RFID tag embedded in the first luminaire 130A that may be read by the mobile electronic device 155 during configuration or from a QR code from a tag attached to the first luminaire 130A or included on documentation provided with the first luminaire 130A that may be captured by a mobile electronic device 155 during configuration.

The profile may provide information about what power needs to be provided to the two DC power inputs 131, 132 of the first luminaire 130A to achieve the target CCT (and/or target brightness). The profile may include a set of pairs of power supply values corresponding to different CCT values at full brightness, a table of pairs of power supply values with different rows corresponding to different brightness values and different columns corresponding to different CCT values, coefficients for pre-determined equations that calculate power supply values based on CCT values and/or brightness values (e.g. polynomial equations of degree 2, 3, 4, 5, 6, or 7), symbolic representations of equations that calculate power supply values based on CCT values and/or brightness values, or any other representation of how to calculate power supply values for a particular CCT and/or brightness value for a particular luminaire.

In some embodiments, a state of the switch 157, a command from the remote control 153, or a command from the mobile electronic device 155 is sent to the lighting controller 110 and used to control whether the luminaire 130A/B/C is on or off, but the target CCT and/or brightness set by a scene is used to set the target DC power delivered to the luminaire 130A/B/C so that the luminaire 130A/B/C emits light at the target CCT and/or brightness when turned on. In some embodiments, an actual physical switch on the connections between the DC power supplies 121,122 and the luminaires 130A/B/C may be used to determine whether the luminaires 130A/B/C are on with the lighting controller 110 controls the DC power supplies 121, 122 to deliver the calculated DC power levels to the luminaires 130A/B/C when the switch is on. In another embodiment, an AC power switch may control whether AC power is provided to the DC power supplies 121, 122 with the lighting controller 110 controlling the DC power supplies 121, 122 to deliver the calculated DC power levels to the luminaires 130A/B/C when the switch is on.

The method performed by the processor 111 also includes calculating a first target power for the first DC power input 131 of the first luminaire 130A and a second target power for a second DC power input 132 of the first luminaire 130A based on the target CCT and the first profile. The first target power and the second target power are calculated to drive the first luminaire 130A to emit light at the target CCT. In some embodiments the method performed by the processor 111 also includes obtaining a target brightness setting for the one or more luminaires 130A/B/C and calculating the first target power and the second target power further based on the target brightness setting and the first profile, where the first target power and the second target power are calculated to drive the first luminaire 130A to emit light at the target brightness with the target CCT. The processor 111 then controls the first DC power supply 121 to deliver the first target power to the first DC power input 131 of the first luminaire 130A and a second DC power supply 122 to deliver the second target power to the second DC power input 132 of the first luminaire 130A.

The expanded lighting system 100B also includes a second luminaire 140A that is driven by a third DC power supply 123 coupled to its first DC power input 141 and a fourth DC power supply 124 coupled to its second DC power input 142. The method performed by the processor 111 may also then include obtaining a second profile, different than the first profile, for the second luminaire 140A. This may be done using a type identifier of the second luminaire 140A to retrieve the second profile from the database 119 or by using any other method, such as those described above. The method performed by the processor 111 also includes calculating a third target power for a first DC power input 141 of the second luminaire 140A and a fourth target power for a second DC power input 142 of the second luminaire 140A based on the target CCT (and/or brightness) and the second profile. The third target power and the fourth target power are calculated to drive the second luminaire 140A to emit light at the target CCT (and/or brightness). The processor 111 then controls the third DC power supply 123 to deliver the third target power to the first DC power input 141 of the second luminaire 140A and a fourth DC power supply 124 to deliver the fourth target power to the second DC power input 142 of the second luminaire 140A.

In the expanded lighting system 100B there are additional luminaires added to create a first set of luminaires 130A, 130B, 130C driven by the first and second DC power supplies 121, 122 and a second set of luminaires 140A, 140B, 140C driven by the third and fourth DC power supplies 123, 124. In order to provide enough power to each of the luminaires in a set of luminaires, the processor 111 determines that N other luminaires 130B, 130C of the one or more luminaires are also associated with the first profile and that a first DC power input and a second DC power input of the N other luminaires 130B, 130C are respectively electrically coupled to the first DC power input 131 and the second DC power input 132 of the first luminaire 130A, The first DC power supply 121 is then controlled by the processor 111 to deliver N+1 times the first target power and the second DC power supply 122 is controlled by the processor 111 to deliver N+1 times the second target power.

Note that there are two different ways that two or more luminaires can be coupled to the same set of DC power supplies, serially (as shown for the first set of luminaires 130A, 130B, 130C), and in parallel (as shown for the second set of luminaires 140A, 140B, 140C). So, if the processor 111 determines that the first luminaire 130A and the N other luminaires 130C, 130C are serially coupled to the first DC power supply 121 and to the second DC power supply 122, the processor 111 sets voltages of the first DC power supply 121 and the second DC power supply 122 based on N. For example if the first set of luminaires are all of the same type and the first luminaire 130A expects to be driven at 12 VDC for full brightness at each DC power input 131, 132 (which may be determined based on the first profile), the first and second DC power supplies 121, 122 may be set for a voltage of 3×12=36 VDC and the power delivered controlled by pulse-width modulation (PWM) or pulse-density modulation (PDM) of the outputs to provide the target CCT and/or target brightness.

But if the processor 111 determines that the second luminaire 140A and the N other luminaires 140B, 140C are coupled in parallel to the third DC power supply 123 and to the fourth DC power supply 124, the processor 111 may set currents of the third DC power supply 123 and the fourth DC power supply 124 based on N. So for example, if the second set of luminaires 140A, 140B, 140C are all of the same type and the calculated current based on the second profile and target CCT and/or brightness is 1 A for the first DC power input and 2 A for the second DC power input, the processor 111 may multiply those values by 3 to determine how to set the DC power supplies 123, 124.

Figure 2A:
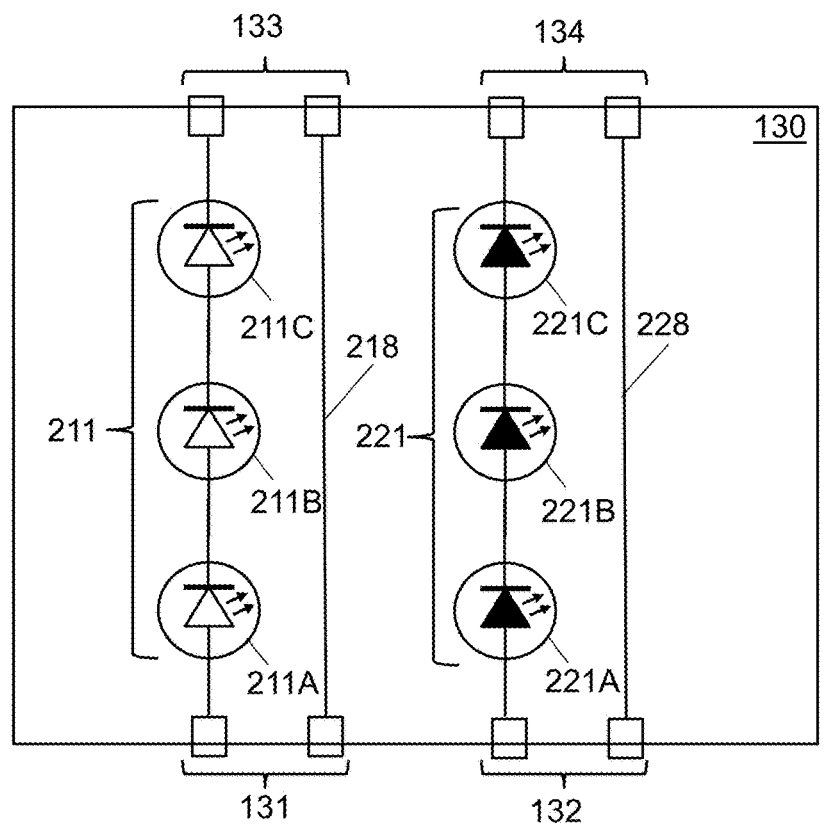
FIGS. 2A and 2B are schematic diagrams embodiments of luminaires suitable for use in the expanded lighting system of FIG. 1B.
Figure 2B:
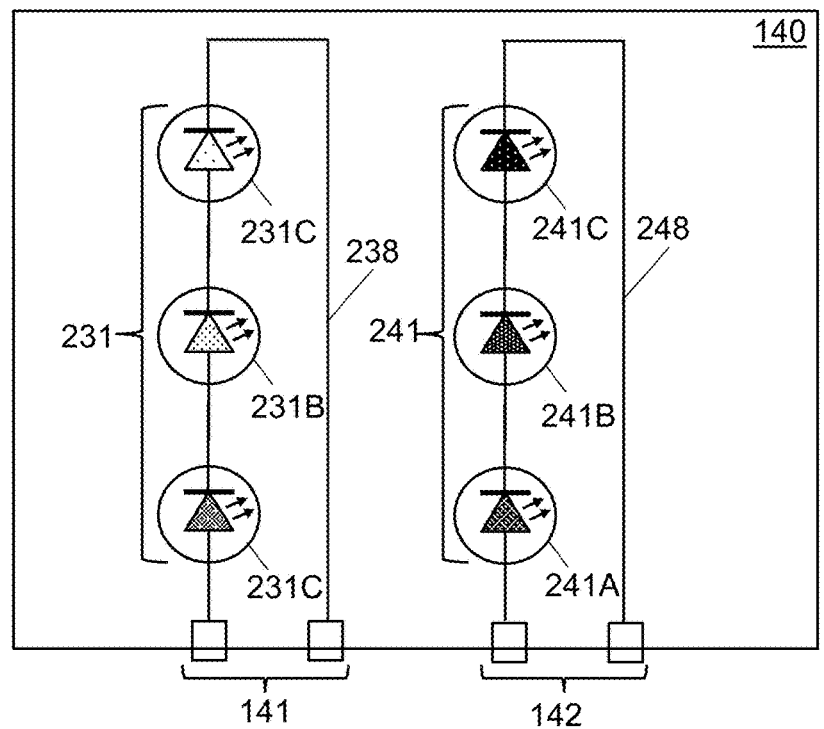

FIG. 2A is a schematic diagram of an embodiment of the first luminaire 130 (used for 130A, 130B, and 130C) and FIG. 2B is a schematic diagram of an embodiment of the second luminaire 140 (used for 140A, 140B, and 140C) of the expanded lighting system 100B. The embodiments shown are as an example only and other embodiments may include any other number and/or configuration of two sets of LEDs driven from two DC power inputs where the first set of LEDs has a CCT of less than 4000K and the second set of LEDs has a CCT of greater than 4000K. So, in at least some embodiments, a luminaire for use in the lighting system 100B has no electrical power inputs other than the first DC power input 131/141 and the second DC power input 132/142. In other embodiments, a luminaire having more than two DC power inputs, such as a first DC power input for a set of red LEDs, a second DC power input for a set or green LEDs, and a third DC power input for a set of blue LEDs may be used, coupled to three DC power supplies under control of a lighting controller as described herein.

The first luminaire 130 includes a first set of LEDs 211 that has three identical first LEDs 211A, 211B, 211C connected in series between the first DC power input 131 and the first power output 133. The first LEDs 211A, 211B, 211C may have a narrow band emission of orange light or may utilize a phosphor to emit a warm white light as a wide band emission. The first set of LEDs 211, when driven from the first DC power input 131, emit light having a CCT less than 4000K, such as 2700K, 2400K, 2000K or lower.

The first luminaire 130 includes a second set of LEDs 221 that has three identical second LEDs 221A, 221B, 221C connected in series between the second DC power input 132 and the second power output 134. The second LEDs 221A, 221B, 221C may have a narrow band emission of blue light or may utilize a phosphor to emit a cool white light. The second set of LEDs 221, when driven from the second DC power input 132, emit light having a CCT greater than 4000K, such as 5000K, 6000K, or higher. Note that while each set of LEDs is shown with its own separate return path, in some embodiments, a shared return path may be used to reduce the combined number of contacts for the combined first and second power inputs 131, 132 from four to three.

The first luminaire 130 is designed to be used with other luminaires of the same type in series. So looking at FIG. 1B, the first power input of luminaire 130B is electrically connected to the first power output 133 of the first luminaire 130A and the second power input of luminaire 130B is electrically connected to the second power output 134 of the first luminaire 130A (thereby electrically coupling the first and second power inputs of the luminaire 130B with the first and second power inputs 131, 132 of the first luminaire 130A). Configurations may support any number of luminaires in series depending on the characteristics of the first power supply 121 and the second power supply 122 along with the power requirements of the first luminaire 130. A terminator may be connected between the two contacts of the first power output and between the two contacts of the second power output of the final luminaire in the series to allow for a return path of the current through connectors 218,228.

FIG. 2B is a schematic diagram of an embodiment of the second luminaire 140. The second luminaire 140 includes a first set of LEDs 231 that has three different first LEDs 231A, 231B, 231C connected in series between the power and return connections of the first DC power input 141. The first LEDs 231A, 231B, 231C may individually have a narrow band emission of light or may utilize a phosphor to emit a spectrum of color. The first set of LEDs 231, when driven from the first DC power input 141, emit light having a CCT less than 4000K, such as 2700K, 2400K, 2000K or lower.

The second luminaire 140 includes a second set of LEDs 241 that has three different first LEDs 241A, 241B, 241C connected in series between the power and return connections of the second DC power input 142. The first LEDs 241A, 241B, 241C may individually have a narrow band emission of light or may utilize a phosphor to emit a spectrum of color. The second set of LEDs 241, when driven from the second DC power input 142, emit light having a CCT greater than 4000K, such as 5000K, 6000K, or higher. Note that while each set of LEDs is shown with its own separate return path, in some embodiments, a shared return path may be used to reduce the combined number of contacts for the combined first and second power inputs 141, 142 from four to three.

The second luminaire 140 is designed to be used with other luminaires of the same type in parallel. So, looking at FIG. 1B, the first power inputs of luminaires 140A, 140B, 140C are electrically connected together through conductor 238 and the second power inputs of luminaires 140A, 140B, 140C are electrically connected together through conductor 248. Configurations may support any number of luminaires in parallel depending on the characteristics of the third power supply 123 and the fourth power supply 124 along with the power requirements of the second luminaire 140.

The DC power supplies 121-124 may deliver the power delivered to their connected set of luminaires 130A/B/C, 140A/B/C by any appropriate method in response to control by the lighting controller 110. PWM or PDM are examples of how the power delivered can be controlled to a set of luminaires. Examples of technologies for controlling the power delivered to light emitting diodes which may be used with the luminaires 130, 140 are described, for instance, in U.S. Pat. No. 8,299,987, "Modulation Method and Apparatus For Dimming and/or Colour Mixing Utilizing LEDs", which issued on Oct. 30, 2013; U.S. Pat. No. 8,525,446, "Configurable LED Driver/Dimmer for Solid State Lighting Applications", which issued on Sep. 3, 2013; and U.S. Pat. No. 9,942,954, "Method and System for Controlling Solid State Lighting Via Dithering", which issued on Apr. 10, 2018; all of which are expressly incorporated by reference in their entirety herein.

Figure 3A:
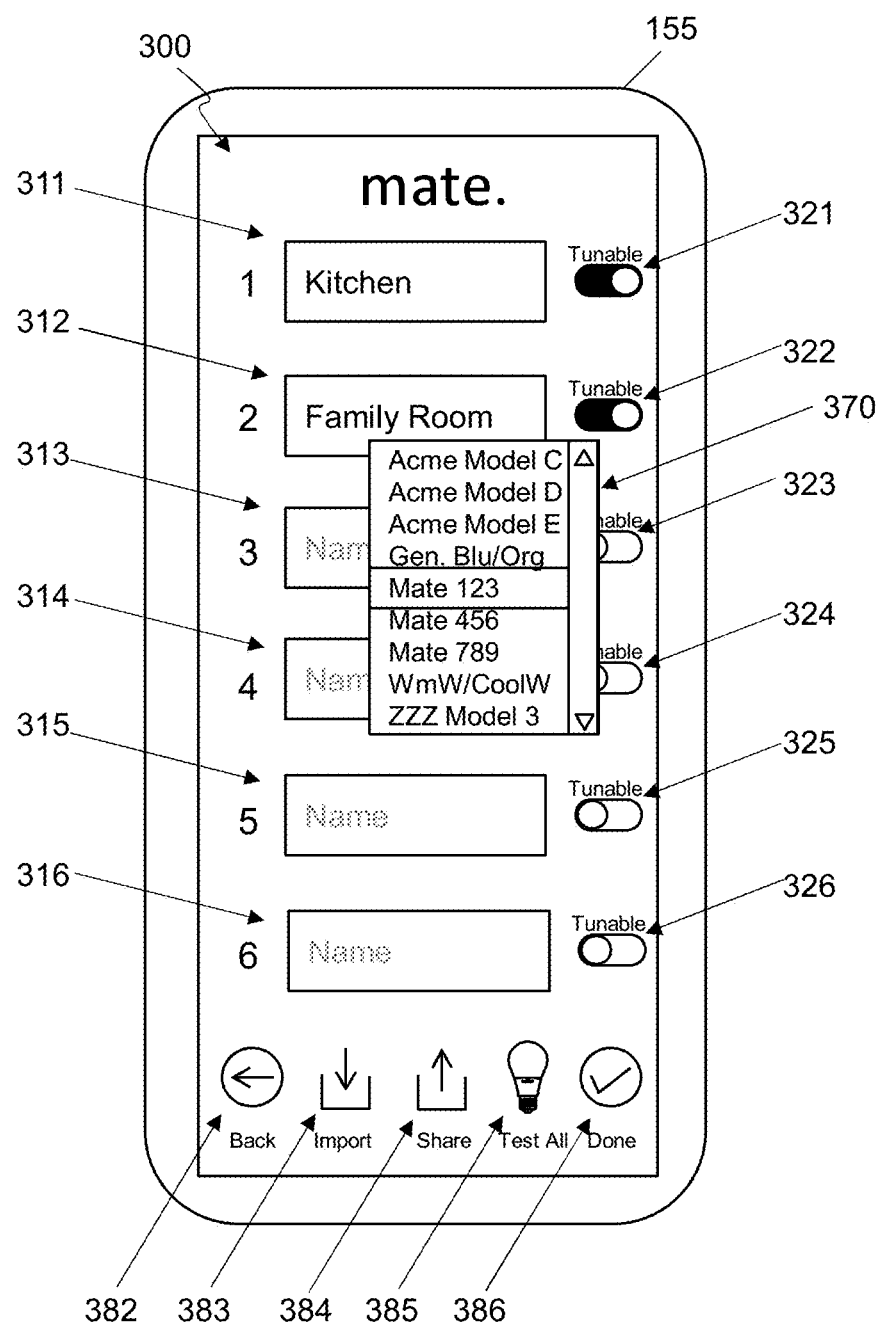
FIGS. 3A and 3B depict embodiments of graphical user interfaces on a mobile electronics device suitable for use with the lighting systems of FIGS. 1A and 1B.

FIG. 3A depicts an embodiment of a graphical user interface (GUI) 300 on a mobile electronics device 155 suitable for use with a lighting systems 100A, 100B using DC-tunable luminaires. The mobile electronics device 155 may be a smartphone, tablet, mobile computer, or any other type of mobile electronics device. The GUI 300, or an equivalent GUI, may alternatively or additionally be made available on a non-mobile electronics device, such as a desktop computer or kiosk. The GUI 300 may be used to program or configure the lighting controller 110 by communicating through its network interface 112. The GUI 300 provides a mechanism for a user or installer, such as a technician or electrician, to identify and name the luminaires 130, 140 in the lighting system 100A, 100B and/or program scenes for the luminaires 130, 140. The GUI 300 includes one or more name fields 311-316 for identifying the luminaires 130, 140 to be controlled, such as the luminaires in a room, a house, an office building, or other structure, for example. In one embodiment, when a user (such as an electrician, an installer, and/or a homeowner) selects one of the name fields 312, the user can enter a user-friendly name for the set of luminaires to be controlled together, such as "Family Room." Selecting the name field 312 or entering a name into the name field 312 may cause the lighting controller 110 to activate the luminaires 140A/B/C associated with that name field, such as be turning on the third and fourth DC power supplies 123, 124 to a known safe value, to allow the user to positively identify the luminaires 140A/B/C being controlled.

The GUI 300 may also include switches 321-326 which can be used to indicate whether the luminaires associated with that name field are tunable, that is that they can have their CCT and/or brightness adjusted. Other embodiments may provide two different switches or a three position switch to indicate whether just the brightness or both the brightness and CCT can be controlled. In at least one embodiment, activation of the tunable switch 322 brings up another menu 370 to allow the user to identify the type of luminaire associated with that name field 312. The user may scroll through the menu 370 to find the appropriate type identifier of luminaire and then select it within the menu 370 by tapping on the proper type, thus the type identifier of the luminaire may be received from a user. The type identifier may include a model number, a serial number, or a manufacturer. In other embodiments, selecting the tunable switch 322 may initiate an RFID scan to receive information from an RFID tag associated with the luminaire or initiate a QR code scan using a camera of the mobile electronic device 155. In some embodiments a type of the luminaire may be received from the first luminaire over a digital communication link. Once the type of luminaire for a particular name field, the type information may be used to obtain a profile for the luminaires associated with that name field.

In one embodiment, the GUI 300 may include an Import control 383 that may be used to cause the lighting controller 110 to import a floor plan, names of sets of luminaires to be controlled, and/or the type(s) of luminaires. The GUI 300 may also include a Share control 384 that may be used to cause the lighting controller 110 to export information regarding the settings of the lighting controller 110, the luminaires, or other settings. In one embodiment, the Share control 384 may allow a user to export names of luminaires and/or wall switches/dimmers to a label maker or printer to print labels for use in a breaker box and/or the luminaires and/or wall switches/dimmers. The GUI 300 may also include a Test control 385 that may cause the lighting controller 110 to automatically verify power and control of the luminaires 130A/B/C, 140A/B/C, such as by causing them to turn on and off or blink. Clicking the Back control 382 may cause the mobile electronics device 155 to return to a previous GUI and clicking on the Done control 386 may exit the app generating the GUI 300. Embodiments of the GUI 300 may also provide mechanisms to identify the number and configuration of luminaires controlled together, such as that there are three luminaires 140A/B/C connected in parallel that are controlled as "Family Room."

Figure 3B:
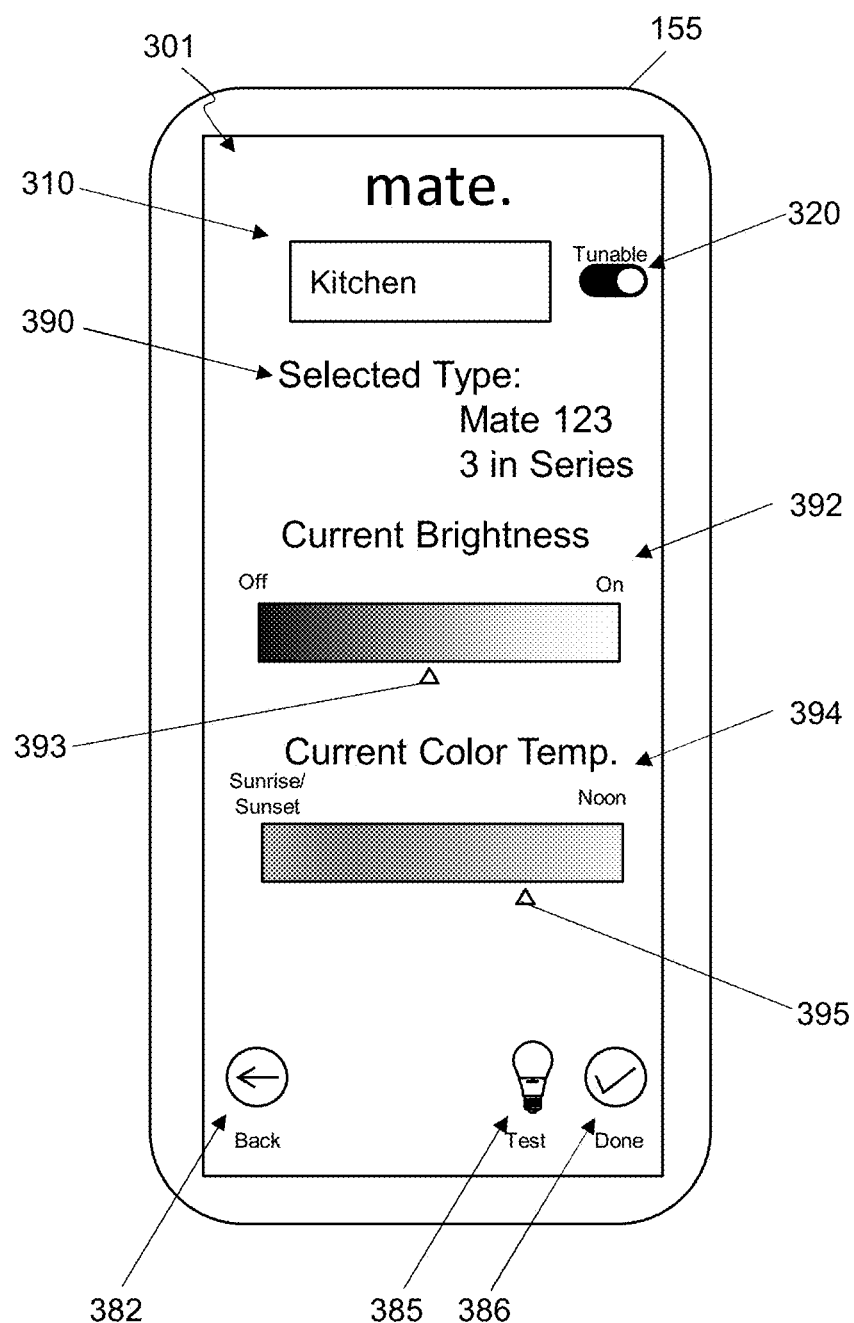

FIG. 3B depicts an embodiment of a GUI 301 on the mobile electronics device 155 suitable for use with a lighting systems 100A, 100B using DC-tunable luminaires. The mobile electronics device 155 may be a smartphone, tablet, mobile computer, or any other type of mobile electronics device. The GUI 301, or an equivalent GUI, may alternatively or additionally be made available on a non-mobile electronics device, such as a desktop computer or kiosk. The GUI 301 may be used to set brightness and/or the CCT for luminaires controlled by the lighting controller 110 by communicating through its network interface 112. The GUI 301 includes a name 310 of the group of luminaires 130A/B/C being controlled and a switch/indicator 320 of whether or not those luminaires have tunable CCT and or variable brightness. Information 390 may be provided about the type and/or number and/or configuration of the luminaires 130A/B/C. A Current Brightness section 392 may show the current brightness of the group of luminaires 130A/B/C and a selector 393 may be movable by a user to change the brightness. A Current Color Temperature section 394 may show the current CCT of the group of luminaires 130A/B/C and a selector 395 may be movable by a user to change the CCT. A Test control 385 may cause the luminaires 130A/B/C to blink, move through their range of brightness, and/or move through their range of supported CCT values. Clicking the Back control 382 may cause the mobile electronics device 155 to return to a previous GUI and clicking on the Done control 386 may exit the app generating the GUI 301. Other embodiments may allow different scenes to be configured for this group, such as a starting and/or ending solar event or time of day with associated with a particular CCT and/or brightness.

So, in embodiments, the lighting controller 110 may obtain a target brightness setting for a first luminaire 130 and calculate the first target power and the second target power further based on the target brightness setting and the first profile. The first target power and the second target power are calculated to drive the first luminaire 130 to emit light at the target brightness with the target CCT. The lighting controller 110 may receive a user control for the first luminaire from a user input device, such as a mobile electronic device 155 with a graphical user interface 301 and calculate the first target power and the second target power further based on the user control. The user control may include a brightness setting, an on/off control, or the target CCT.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions or by configuration information for a field-programmable gate array (FPGA). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Similarly, the configuration information for the FPGA may be provided to the FPGA and configure the FPGA to produce a machine which creates means for implementing the functions/acts specified in the flowchart and/or block diagram block or blocks.

These computer program instructions or FPGA configuration information may be stored in a computer readable medium that can direct a computer, other programmable data processing apparatus, FPGA, or other devices to function in a particular manner, such that the data stored in the computer readable medium produce an article of manufacture including instructions which implement the function/act specified in the flowchart and/or block diagram block or blocks. The computer program instructions or FPGA configuration information may also be loaded onto a computer, FPGA, other programmable data processing apparatus, or other devices to cause a series of operational steps to be performed on the computer, FPGA, other programmable apparatus, or other devices to produce a computer implemented process for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code comprising one or more executable instructions, or a block of circuitry, for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
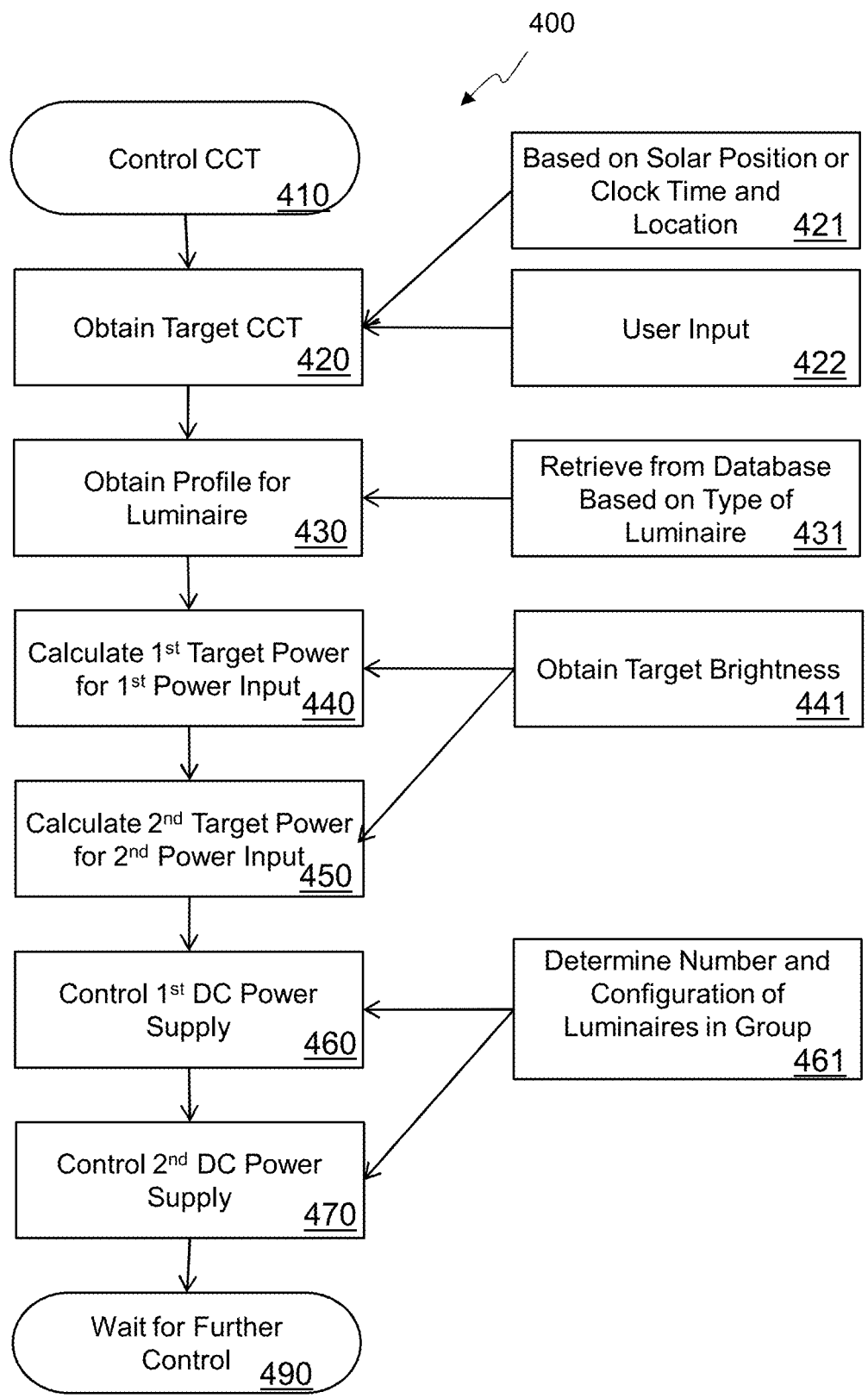
FIG. 4 is a flow chart of an embodiment of a method for controlling a correlated color temperature (CCT) of one or more luminaires.

FIG. 4 is a flow chart 400 of an embodiment of a method for controlling 410 a correlated color temperature (CCT) of one or more luminaires. The method includes obtaining 420 a target CCT for the one or more luminaires. Any appropriate mechanism can be used to obtain a target CCT. In at least one embodiment, a solar position or a clock time for a location of the one or more luminaires is determined and the target CCT is determined 421 based on those parameters. Scenes defined for particular solar events, solar periods, or time periods may be pre-defined to provide a target CCT. In other embodiments a user input is received 422 to set a target CCT.

The method continues with obtaining 430 a first profile associated with a first luminaire of the one or more luminaires. The profile may be obtained by an appropriate method, but in some embodiments a type identifier of the first luminaire is obtained, and the first profile retrieved 431, based on the type identifier of the first luminaire, from a database storing a plurality of profiles. The type identifier may include a model number, a serial number, a manufacturer, information received from the first luminaire over a digital communication link, information from an RFID tag, information from a QR code, and or any other information that can be useful in identifying the luminaire. In some embodiments, the type identifier may be received from a user.

In some embodiments, a target brightness setting may be obtained 441 for the one or more luminaires. The target brightness setting may be obtained along with the CCT from predefined scenes in some embodiments. The target brightness (which may be any brightness value including on or off) may be received as a user control to a user input device such as a wall switch, a wireless remote control, or a mobile electronic device with a graphical user interface.

A first target power for a first DC power input of the first luminaire is calculated 440 and a second target power for a second DC power input of the first luminaire is calculated 450 based on the target CCT and the first profile. The first target power and the second target power are calculated to drive the first luminaire to emit light at the target CCT. In embodiments where brightness is controlled, the first target power and the second target power are calculated 440, 450 further based on the target brightness setting and the first profile with the first target power and the second target power calculated to drive the first luminaire to emit light at the target brightness with the target CCT. In systems where a user control for the first luminaire is received from a user input device, the first target power and the second target power are calculated 440, 450 further based on the user control.

One the target powers have been calculated, a first DC power supply is controlled 460 by the lighting controller to deliver the first target power to the first DC power input of the first luminaire and a second DC power supply is controlled 470 by the lighting controller to deliver the second target power to the second DC power input of the first luminaire. The DC power supplies can be controlled through communication from the lighting controller to the DC power supplies through a communication channel such as DMX, Ethernet, or across the internet from a server running software to implement the lighting controller. Once the DC power supplies have been set to deliver the target power, the lighting controller may wait 490 for further control such as another solar event, a predetermined time, or a user input.

In systems controlling multiple groups with different types of luminaires in different groups, the method may also include obtaining a second profile, different than the first profile, for a second luminaire of the one or more luminaires, and calculating a third target power for a first direct-current (DC) power input of the second luminaire and a fourth target power for a second DC power input of the second luminaire based on the target CCT and the second profile, the third target power and the fourth target power calculated to drive the second luminaire to emit light at the target CCT. A third DC power supply is controlled to deliver the third target power to the first DC power input of the second luminaire and a fourth DC power supply is controlled to deliver the fourth target power to the second DC power input of the second luminaire.

Embodiments may determine 461 a number and configuration of luminaires in a group. This may be done by determining that N other luminaires of the one or more luminaires are also associated with the first profile and that a first DC power input and a second DC power input of the N other luminaires are respectively electrically coupled to the first DC power input and the second DC power input of the first luminaire. This may be accomplished automatically using network discover protocols, manually with user input or a combination thereof. The first DC power supply is then controlled to deliver N+1 times the first target power and the second DC power supply controlled to deliver N+1 times the second target power. In such systems, the lighting controller may determine that the first luminaire and the N other luminaires are serially coupled to the first DC power supply and to the second DC power supply and set voltages of the first DC power supply and the second DC power supply based on N. The lighting controller may alternatively determine that the first luminaire and the N other luminaires are coupled in parallel to the first DC power supply and to the second DC power supply and set currents of the first DC power supply and the second DC power supply based on N.

Figure 5:
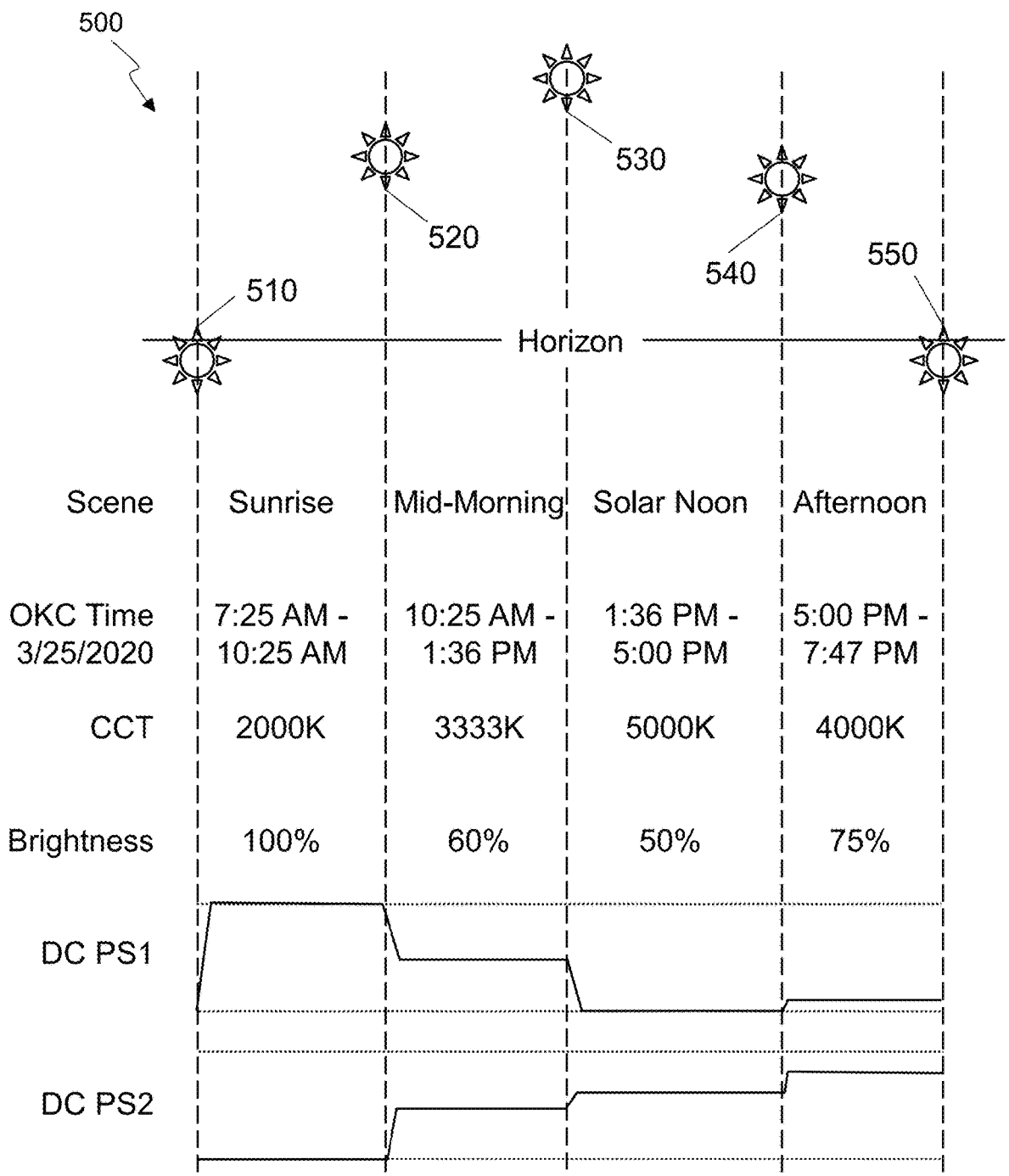
FIG. 5 shows an example behavior of an embodiment of a lighting system through a day.

FIG. 5 shows an example behavior 500 of an embodiment of a lighting system through a day. The lighting system may be any lighting system using elements described herein, such as lighting system 100A of FIG. 1A or lighting system 100B of FIG. 1B. But for simplicity, it is assumed that in the lighting system used for the example shown in FIG. 5, there is only a single set of luminaires, all of the same type, connected to a single pair of DC power supplies under control of the lighting controller.

In one embodiment a lighting controller may receive and/or obtain a geographical location of a user, luminaire, or another geographical location, and/or a desired time zone. The geographical location and/or the time zone may be provided by the user, obtained from or provided by an electronic device associated with the user, and/or based on the geographical location of the lighting controller. The lighting controller may also receive or obtain solar event information indicative of times of occurrence of predetermined solar events for one or more day at the geographical location and/or in the time zone. The solar event information may be obtained from external databases, one example of which is provided by Sunrise-Sunset.org. Another example of a source of solar event information is the Global Monitoring Division of the Earth System Research Laboratory of the National Oceanic & Atmospheric Administration of the U.S. Department of Commerce. In one embodiment, the lighting controller may calculate the times of occurrence of predetermined solar events for one or more day at the geographical location or in the time zone based on astronomical algorithm, which are known to people having ordinary skill in the art. The example 500 uses solar event information for Oklahoma City, Oklahoma on Mar. 25, 2020, but a similar example could be shown for any location and date. Thus, times shown in example 500 are provided for that date and location in central daylight savings time (CDT).

In the example 500, the lighting controller has been configured to change the lighting at five different times during the day, sunrise 510 (7:25 AM), sunrise plus 3 hours 520 (10:25 AM), solar noon 530 (1:36 PM), 5:00 PM 540, and sunset 550 (7:47 PM). These events are chosen as an example only. Any combination of events may be used in embodiments to change the lighting, including solar events, particular times of day, events detected by sensors, or inputs from a user. Example 500 has five different lighting scenes (or periods), sunrise which starts at 7:25 AM and ends at 10:25 AM, mid-morning which starts at 10:25 AM and ends at 1:36 PM, solar noon which starts at 1:36 PM and ends at 5:00 PM, afternoon, which starts at 5:00 PM and ends at 7:47 PM, and night (not shown) which includes 12:00 AM-7:25 AM and 7:47 PM through the end of the day (12:00 AM, Mar. 26, 2020).

The lighting controller may have been previously programmed with assigned settings indicative of scenes which may vary the CCT and brightness for each lighting period. Embodiments may set a CCT and/or brightness for the lighting based on scenes or simply upon events. The lighting controller may have a default setting which is used when a time period assigned to a scene ends and no new setting has been provided, such as being set to off. In other embodiments, the lighting controller may be configured to change the CCT and/or brightness in response to an event, such as sunrise for that particular date, or an input from a sensor, and to leave the CCT/brightness at that level until a new event is detected. In another embodiment, the predefined scenes may set a CCT/brightness to be used another device such as switch or remote control turns on a luminaire, but the predefined scenes may not be used to actually turn a luminaire on if it has been set to be off by the other device. In the example shown the periods each have a defined CCT and brightness setting, with night being off (0% brightness) with no change to the CCT, sunrise being 100% brightness with a CCT value of 2000K, mid-morning being 60% brightness with a CCT value of 3333K, solar noon being 50% brightness with a CCT value of 5000K, and afternoon being 75% brightness with a CCT value of 4000K.

The lighting controller can then detect the events that have been programmed or use a current clock time to see that the next period has been entered and compute power levels for the two DC power supplies driving the luminaires, based on the target brightness/CCT settings and the profile for the luminaires, to set the brightness and CCT of the light emitted by the luminaires to meet the targets. For example 500, the profile for the luminaire may provide a drive type (voltage for CV drive, current for CC drive) for each of its two DC power inputs (which may be an encoded 8 bit value for each selecting one of 256 standard settings in this example) and then provide a two dimensional matrix of 8 bit values (representing a linear percentage of maximum power with '00000000' being 0% and '11111111' being 100%) for each of the two power supplies with one dimension of the matrix being brightness at 5% steps from 0% to 100% and the other dimension being CCT at 250K steps from 2000K to 5000K.

The profile can provide the information about the luminaire in any way, and at any quantization, depending on the embodiment. In the example given, the profile would be a 21×13×16 bit matrix plus two bytes identifying the drive type for a total of 548 bytes. Other embodiments may provide more or less information by changing the quantization (i.e. step size) of the CCT and/or the brightness to change the size of the matrix and/or change the size of the data value for each power supply setting (i.e. a quantization of the power supply setting). For example, another embodiment may change the brightness step size to 10%, reducing the matrix size to 11×13 and use 4 bits to represent the percentage of power for each power supply, reducing the profile size to 145 bytes. Some embodiments may compress the profile using a lossless compression scheme to reduce the amount of storage needed for each profile. Other embodiments may provide equations, such as by providing coefficients for 7 pairs of 5th-degree polynomials corresponding to 7 different CCT values which take the target brightness as their input and generate a power output for a DC power supply, coefficients for a different predefined set of equations each corresponding to a particular brightness value that takes a CCT value as its input and computes power levels, or a symbolic representation of a pair of equations that directly compute the power values based on the CCT and brightness targets. Other embodiments may use provide different representations of how to compute target power levels based on target CCT and/or brightness levels.

So, in example 500, the lighting controller determines that the time of the sunrise has occurred and computes a power setting for the first and second DC power supplies to cause the luminaires to generate 100% brightness at a CCT of 2000K for the sunrise scene. It retrieves the profile and looks up the power settings for those targets and may find that the first DC power supply should be set to 100% and second DC power supply should be set to 0%. At three hours after sunrise, the lighting controller accesses the profile to determine settings for a 60% brightness with a CCT value of 3333K for the mid-morning scene, but the profile of this example only has settings for (60%, 3250K) and (60%, 3500K). In some embodiments, the closest settings may be selected and used, such as the 50% setting for each power supply shown. In other embodiments, the power supply settings may be interpolated between the two surrounding settings. So, for example if the profile value for the first power supply is 50% for (60%, 3250K) and 55% for (60%, 3500K), an interpolated value of 51.7% may be calculated for the first power supply.

For each scene setting the two DC power supplies are calculated, so that for the solar noon scene the first power is set to 0% and the second power supply is set to 62% and for the afternoon scene, the first power supply is set to 12% and the second power supply is set to 82%. For the night scene, the luminaires are set to off so both power supplies are set to 0%. Note that the profile information and power levels provided for example 500 may or may not correspond to any actual luminaire but are used for example purposes only. A profile for a particular luminaire may be provided by the manufacturer of the luminaire or generated by a third party by taking measurements of one or more luminaires to determine the profile.

The lighting controller may then transmit signals to the DC power supplies to regulate electrical power sent to first power inputs and second power inputs of the luminaires in the system to produce light from luminaires at the CCT and/or level of brightness assigned to specific solar events or periods at the times of occurrence of the predetermined solar events based on the solar event information. The transition between CCT and/or brightness levels may occur in a single step or may transition over a period of time, depending on the embodiment. The transition may be managed by the lighting controller calculating changing values over a transition period and gradually changing the settings in the DC power supplies. In other embodiments, the DC power supplies may have the ability to ramp the changes themselves.

As will be appreciated by those of ordinary skill in the art, aspects of the various embodiments may be embodied as a system, device, method, computer program product apparatus, or article of manufacture. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "server," "circuitry," "module," "client," "computer," "logic," "FPGA," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for an FPGA or other programmable logic as well as traditional binary computer instructions, and the term "processor" explicitly includes logic in an FPGA or other programmable logic configured by the configuration information in addition to a traditional processing core. Furthermore, "executed" instructions explicitly includes electronic circuitry of an FPGA or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. In addition, the computer program code may be written in VHDL or another hardware description language to generate configuration instructions for an FPGA or other programmable logic. The computer program code if converted into an executable form and loaded onto a computer, FPGA, or other programmable apparatus, produces a computer implemented method. The instructions which execute on the computer, FPGA, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Examples of various embodiments are described in the following paragraphs:

Embodiment 1. A method for controlling a correlated color temperature (CCT) of one or more luminaires, the method comprising: obtaining a target CCT for the one or more luminaires; obtaining a first profile associated with a first luminaire of the one or more luminaires; calculating a first target power for a first direct-current (DC) power input of the first luminaire and a second target power for a second DC power input of the first luminaire based on the target CCT and the first profile, the first target power and the second target power calculated to drive the first luminaire to emit light at the target CCT; and controlling a first DC power supply to deliver the first target power to the first DC power input of the first luminaire and a second DC power supply to deliver the second target power to the second DC power input of the first luminaire.

Embodiment 2. The method of embodiment 1, wherein the first luminaire has no electrical power inputs other than the first DC power input and the second DC power input.

Embodiment 3. The method of embodiment 1 or 2, further comprising: obtaining a type identifier of the first luminaire; and retrieving the first profile from a database storing a plurality of profiles based on the type identifier of the first luminaire.

Embodiment 4. The method of embodiment 3, wherein the type identifier comprises a model number, a serial number, a manufacturer, information received from the first luminaire over a digital communication link, information from an RFID tag, and/or information from a QR code.

Embodiment 5. The method of embodiment 3 or 4, further comprising receiving the type identifier from a user.

Embodiment 6. The method of any of embodiments 1-5, further comprising: obtaining a second profile, different than the first profile, for a second luminaire of the one or more luminaires; calculating a third target power for a first direct-current (DC) power input of the second luminaire and a fourth target power for a second DC power input of the second luminaire based on the target CCT and the second profile, the third target power and the fourth target power calculated to drive the second luminaire to emit light at the target CCT; and controlling a third DC power supply to deliver the third target power to the first DC power input of the second luminaire and a fourth DC power supply to deliver the fourth target power to the second DC power input of the second luminaire.

Embodiment 7. The method of any of embodiments 1-6, further comprising: determining that N other luminaires of the one or more luminaires are also associated with the first profile and that a first DC power input and a second DC power input of the N other luminaires are respectively electrically coupled to the first DC power input and the second DC power input of the first luminaire; controlling the first DC power supply to deliver N+1 times the first target power and the second DC power supply to deliver N+1 times the second target power.

Embodiment 8. The method of embodiment 7, further comprising: determining that the first luminaire and the N other luminaires are serially coupled to the first DC power supply and to the second DC power supply; and setting voltages of the first DC power supply and the second DC power supply based on N.

Embodiment 9. The method of embodiment 7, further comprising: determining that the first luminaire and the N other luminaires are coupled in parallel to the first DC power supply and to the second DC power supply; and setting currents of the first DC power supply and the second DC power supply based on N.

Embodiment 10. The method of any of embodiments 1-10, further comprising: determining a solar position for a location of the one or more luminaires; and determining the target CCT based on the solar position.

Embodiment 11. The method of any of embodiments 1-11, further comprising: determining a clock time for a location of the one or more luminaires; and determining the target CCT based on the clock time and the location.

Embodiment 12. The method of any of embodiments 1-11, further comprising: obtaining a target brightness setting for the one or more luminaires; and calculating the first target power and the second target power further based on the target brightness setting and the first profile, the first target power and the second target power calculated to drive the first luminaire to emit light at the target brightness with the target CCT.

Embodiment 13. The method of any of embodiments 1-12, further comprising: receiving a user control for the first luminaire from a user input device; and calculating the first target power and the second target power further based on the user control.

Embodiment 14. The method of embodiment 13, wherein the user control comprises a brightness setting, an on/off control, or the target CCT; and the user input device comprises a wall switch, a wireless remote control, or a mobile electronic device with a graphical user interface.

Embodiment 15. At least one non-transitory machine readable medium comprising one or more instructions that in response to being executed on a computing device cause the computing device to carry out a method according to any one of embodiments 1 to 14.

Embodiment 16. A lighting controller comprising a power supply control interface configured to communicate with two or more power supplies; a processor coupled to the power supply control interface; and one or more memory devices coupled to the processor and storing instructions to program the processor to perform a method according to any one of embodiments 1 to 14.

Embodiment 17. A direct current tunable lighting control system, comprising: two or more direct current (DC) tunable light fixtures configured to emit light, each of the two or more DC tunable light fixtures comprising: one or more orange LED configured to emit an amount of orange light output, wherein the amount of orange light output correlates with a first amount of power provided to the one or more orange LED, such that an increase in the first amount of power results in an increase in the amount of orange light output and a decrease in the first amount of power results in a decrease in the amount of orange light output; and one or more blue LED, configured to emit an amount of blue light output, wherein the amount of blue light output correlates with a second amount of power provided to the one or more blue LED, such that an increase in the second amount of power results in an increase in the amount of blue light output and a decrease in the second amount of power results in a decrease in the amount of blue light output; one or more direct current (DC) power regulator separate from, but electrically connected to, the two or more DC tunable light fixtures, wherein the DC power regulator is configured to conduct the first amount of power on a first channel to the one or more orange LED of each of the two or more DC tunable light fixtures and to conduct the second amount of power on a second channel to the one or more blue LED of each of the two or more DC tunable light fixtures; and a bridge controller, separate from the two or more DC tunable light fixtures, comprising one or more computer processor configured to execute instructions that cause the one or more computer processor to: receive one or more of a geographical location and a time zone; receive information indicative of times of predetermined solar events for one or more day at the geographical location or in the time zone, wherein the predetermined solar events comprise sunrise, solar noon, and sunset, wherein each of the predetermined solar events has an assigned solar color temperature in a predetermined range; and transmit one or more signal to the DC power regulator at the times of the predetermined solar events, the signal indicative of instructions for the one or more DC power regulator to change at least one of the first amount of power and the second amount of power, such that the light emitted by the two or more DC tunable light fixtures at the times of the predetermined solar events has a fixture color temperature that is in the predetermined range of the assigned solar color temperature of a corresponding predetermined solar event.

Embodiment 18. A direct current tunable lighting control system, comprising: two or more direct current (DC) tunable light fixture configured to emit light, each of the two or more DC tunable light fixtures comprising: one or more orange LED configured to emit an amount of orange light output, wherein the amount of orange light output correlates with a first amount of power provided to the one or more orange LED, such that an increase in the first amount of power results in an increase in the amount of orange light output and a decrease in the first amount of power results in a decrease in the amount of orange light output; and one or more blue LED, configured to emit an amount of blue light output, wherein the amount of blue light output correlates with a second amount of power provided to the one or more blue LED, such that an increase in the second amount of power results in an increase in the amount of blue light output and a decrease in the second amount of power results in a decrease in the amount of blue light output; one or more direct current (DC) power regulator separate from, but electrically connected to, the two or more DC tunable light fixtures, wherein the DC power regulator is configured to conduct the first amount of power on a first channel to the one or more orange LED of each of the two or more DC tunable light fixtures and to conduct the second amount of power on a second channel to the one or more blue LED of each of the two or more DC tunable light fixtures; and a virtual bridge controller, separate from the two or more DC tunable light fixtures, comprising executable instructions, that when executed by one or more computer processor, cause the one or more computer processor to: receive a geographical location or a time zone; receive information indicative of times of predetermined solar events for one or more day at the geographical location or in the time zone, wherein the predetermined solar events comprise sunrise, solar noon, and sunset, wherein each of the predetermined solar events has an assigned solar color temperature in a predetermined range; and transmit one or more signal at the times of the predetermined solar events to the one or more DC power regulator, the signal indicative of instructions to the one or more DC power regulator to change at least one of the first amount of power and the second amount of power, such that the light emitted by the two or more DC tunable light fixtures at the times of the predetermined solar events has a fixture color temperature that is in the predetermined range of the assigned solar color temperature of a corresponding predetermined solar event.

Embodiment 19. A direct current tunable lighting control system, comprising: two or more direct current (DC) tunable light fixture configured to emit light, each comprising: one or more first LED configured to emit an amount of first light output having a first mired value, wherein the amount of first light output correlates with a first amount of power provided to the one or more first LED, such that an increase in the first amount of power results in an increase in the amount of first light output and a decrease in the first amount of power results in a decrease in the amount of first light output; and one or more second LED, configured to emit an amount of second light output, wherein the amount of second light output correlates with a second amount of power provided to the one or more second LED, such that an increase in the second amount of power results in an increase in the amount of second light output and a decrease in the second amount of power results in a decrease in the amount of second light output; one or more direct current (DC) power regulator separate from, but electrically connected to, each of the two or more DC tunable light fixture, wherein the DC power regulator is configured to conduct the first amount of power on a first channel to the one or more first LED and to conduct the second amount of power on a second channel to the one or more second LED; and a bridge controller, separate from the two or more DC tunable light fixtures, comprising one or more computer processor configured to execute instructions that cause the one or more computer processor to: receive a geographical location or a time zone; receive information indicative of times of predetermined solar events for one or more day at the geographical location or in the time zone, wherein the predetermined solar events comprise sunrise, solar noon, and sunset, wherein each of the predetermined solar events has an assigned solar color temperature in a predetermined range; and transmit one or more signal at the times of the predetermined solar events to the DC power regulator, the signal indicative of instructions for the DC power regulator to change at least one of the first amount of power and the second amount of power, such that the light emitted by the two or more DC tunable light fixtures at the times of the predetermined solar events has a fixture color temperature that is in the predetermined range of the assigned solar color temperature of a corresponding predetermined solar event.

Embodiment 20. A method comprising the steps of: receiving, with a bridge controller, information indicative of times of predetermined solar events for one or more day at a geographical location or in a time zone, wherein the predetermined solar events comprise sunrise, solar noon, and sunset, wherein each of the predetermined solar events has an assigned solar color temperature in a predetermined range; and transmitting, at the times of the predetermined solar events with the bridge controller, one or more signal to a DC power regulator connected to two or more direct current (DC) tunable light fixtures, each comprising one or more orange LED and one or more blue LED, one or more signal indicative of instructions to change at least one of a first amount of power transmitted to the one or more orange LED and a second amount of power transmitted to the blue LED, such that light emitted by the two or more DC tunable light fixtures at the times of the predetermined solar events has a fixture color temperature that is in the predetermined range of the assigned solar color temperature of a corresponding predetermined solar event, wherein the bridge controller and the DC power regulator are separate from the two or more DC tunable light fixtures.

Embodiment 21. The embodiment of claim 20, wherein the bridge controller is a virtual bridge controller.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, $\pi$, $3.\overline{33}$, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. Furthermore, "based on" is intended to mean "based, at least in part, on" unless explicitly stated otherwise.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition. As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method for controlling a correlated color temperature (CCT) of one or more luminaires, the method comprising:
    obtaining a target CCT for the one or more luminaires based on a solar position or a clock time associated with the one or more luminaires;
    obtaining a first profile associated with a first luminaire of the one or more luminaires;
    calculating a first target power for a first direct-current (DC) power input of the first luminaire and a second target power for a second DC power input of the first luminaire based on the target CCT and the first profile, the first target power and the second target power calculated to drive the first luminaire to emit light at the target CCT; and
    controlling a first DC power supply to deliver the first target power to the first DC power input of the first luminaire and a second DC power supply to deliver the second target power to the second DC power input of the first luminaire.

2. The method of claim 1, wherein the first luminaire has no electrical power inputs other than the first DC power input and the second DC power input.

3. The method of claim 1, further comprising:
    obtaining a type identifier of the first luminaire; and
    retrieving the first profile from a database storing a plurality of profiles based on the type identifier of the first luminaire.

4. The method of claim 3, wherein the type identifier comprises a model number, a serial number, a manufacturer, information received from the first luminaire over a digital communication link, information from an RFID tag, and/or information from a QR code.

5. The method of claim 3, further comprising receiving the type identifier from a user.

6. The method of claim 1, further comprising:
    obtaining a second profile, different than the first profile, for a second luminaire of the one or more luminaires;
    calculating a third target power for a first direct-current (DC) power input of the second luminaire and a fourth target power for a second DC power input of the second luminaire based on the target CCT and the second profile, the third target power and the fourth target power calculated to drive the second luminaire to emit light at the target CCT; and
    controlling a third DC power supply to deliver the third target power to the first DC power input of the second luminaire and a fourth DC power supply to deliver the fourth target power to the second DC power input of the second luminaire.

7. The method of claim 1, further comprising:
    determining that N other luminaires of the one or more luminaires are also associated with the first profile and that a first DC power input and a second DC power input of the N other luminaires are respectively electrically coupled to the first DC power input and the second DC power input of the first luminaire; and controlling the first DC power supply to deliver N+1 times the first target power and the second DC power supply to deliver N+1 times the second target power; wherein N is a positive integer.

8. The method of claim 7, further comprising:
determining that the first luminaire and the N other luminaires are serially coupled to the first DC power supply and to the second DC power supply; and
setting voltages of the first DC power supply and the second DC power supply based on N.

9. The method of claim 7, further comprising:
determining that the first luminaire and the N other luminaires are coupled in parallel to the first DC power supply and to the second DC power supply; and
setting currents of the first DC power supply and the second DC power supply based on N.

10. The method of claim 1, further comprising:
determining a first solar position for a first location of the first luminaire; and
determining the target CCT based on the first solar position;
wherein the solar position associated with the one or more luminaires comprises the first solar position.

11. The method of claim 1, further comprising:
determining a first clock time for the first luminaire; and
determining the target CCT based on the first clock time;
wherein the clock time associated with the one or more luminaires comprises the first clock time.

12. The method of claim 1, further comprising:
obtaining a target brightness for the one or more luminaires; and
calculating the first target power and the second target power further based on the target brightness and the first profile, the first target power and the second target power calculated to drive the first luminaire to emit light at the target brightness with the target CCT.

13. The method of claim 1, further comprising:
receiving a user control for the first luminaire from a user input device; and
calculating the first target power and the second target power further based on the user control.

14. The method of claim 13, wherein the user control comprises a brightness setting, an on/off control, or a new target CCT; and
the user input device comprises a wall switch, a wireless remote control, or a mobile electronic device with a graphical user interface.

15. At least one non-transitory machine readable medium comprising one or more instructions that in response to being executed on a computing device cause the computing device to carry out a method for controlling a correlated color temperature (CCT) of one or more luminaires, the method comprising:
obtaining a target CCT for the one or more luminaires based on a solar position or a clock time associated with the one or more luminaires;
obtaining a first profile associated with a first luminaire of the one or more luminaires;
calculating a first target power for a first direct-current (DC) power input of the first luminaire and a second target power for a second DC power input of the first luminaire based on the target CCT and the first profile, the first target power and the second target power calculated to drive the first luminaire to emit light at the target CCT; and
controlling a first DC power supply to deliver the first target power to the first DC power input of the first luminaire and a second DC power supply to deliver the second target power to the second DC power input of the first luminaire.

16. The at least one non-transitory machine readable medium as claimed in claim 15, the method further comprising:
obtaining a type identifier of the first luminaire; and
retrieving the first profile from a database storing a plurality of profiles based on the type identifier of the first luminaire.

17. The at least one non-transitory machine readable medium as claimed in claim 15, the method further comprising:
obtaining a second profile, different than the first profile, for a second luminaire of the one or more luminaires;
calculating a third target power for a first direct-current (DC) power input of the second luminaire and a fourth target power for a second DC power input of the second luminaire based on the target CCT and the second profile, the third target power and the fourth target power calculated to drive the second luminaire to emit light at the target CCT; and
controlling a third DC power supply to deliver the third target power to the first DC power input of the second luminaire and a fourth DC power supply to deliver the fourth target power to the second DC power input of the second luminaire.

18. The at least one non-transitory machine readable medium as claimed in claim 15, the method further comprising:
determining that N other luminaires of the one or more luminaires are also associated with the first profile and that a first DC power input and a second DC power input of the N other luminaires are respectively electrically coupled to the first DC power input and the second DC power input of the first luminaire; and
controlling the first DC power supply to deliver N+1 times the first target power and the second DC power supply to deliver N+1 times the second target power; wherein N is a positive integer.

19. The at least one non-transitory machine readable medium as claimed in claim 18, the method further comprising:
determining that the first luminaire and the N other luminaires are serially coupled to the first DC power supply and to the second DC power supply; and
setting voltages of the first DC power supply and the second DC power supply based on N.

20. The at least one non-transitory machine readable medium as claimed in claim 18, the method further comprising:
determining that the first luminaire and the N other luminaires are coupled in parallel to the first DC power supply and to the second DC power supply; and
setting currents of the first DC power supply and the second DC power supply based on N.

21. The at least one non-transitory machine readable medium as claimed in claim 15, the method further comprising:
determining a first solar position for a first location of the first luminaire; and
determining the target CCT based on the first solar position;
wherein the solar position associated with the one or more luminaires comprises the first solar position.

22. The at least one non-transitory machine readable medium as claimed in claim 15, the method further comprising:
   determining a first clock time for the first luminaire; and determining the target CCT based on the first clock time;
   wherein the clock time associated with the one or more luminaires comprises the first clock time.

23. The at least one non-transitory machine readable medium as claimed in claim 15, the method further comprising:
   obtaining a target brightness for the one or more luminaires; and
   calculating the first target power and the second target power further based on the target brightness and the first profile, the first target power and the second target power calculated to drive the first luminaire to emit light at the target brightness with the target CCT.

24. The at least one non-transitory machine readable medium as claimed in claim 15, the method further comprising:
   receiving a user control for the first luminaire from a user input device; and
   calculating the first target power and the second target power further based on the user control.

25. A lighting controller comprising:
   a power supply control interface configured to communicate with two or more power supplies;
   a processor coupled to the power supply control interface; and
   one or more memory devices coupled to the processor, and storing instructions to program the processor to perform a method comprising:
   obtaining a target CCT for one or more luminaires based on a solar position or a clock time associated with the one or more luminaires;
   obtaining a first profile associated with a first luminaire of the one or more luminaires;
   calculating a first target power for a first direct-current (DC) power input of the first luminaire and a second target power for a second DC power input of the first luminaire based on the target CCT and the first profile, the first target power and the second target power calculated to drive the first luminaire to emit light at the target CCT; and
   controlling a first DC power supply to deliver the first target power to the first DC power input of the first luminaire and a second DC power supply to deliver the second target power to the second DC power input of the first luminaire.

26. The lighting controller of claim 25, the method further comprising:
   obtaining a type identifier of the first luminaire; and
   retrieving the first profile from a database storing a plurality of profiles based on the type identifier of the first luminaire.

27. The lighting controller of claim 25, the method further comprising:
   obtaining a second profile, different than the first profile, for a second luminaire of the one or more luminaires;
   calculating a third target power for a first direct-current (DC) power input of the second luminaire and a fourth target power for a second DC power input of the second luminaire based on the target CCT and the second profile, the third target power and the fourth target power calculated to drive the second luminaire to emit light at the target CCT; and
   controlling a third DC power supply to deliver the third target power to the first DC power input of the second luminaire and a fourth DC power supply to deliver the fourth target power to the second DC power input of the second luminaire.

28. The lighting controller of claim 25, the method further comprising:
   determining that N other luminaires of the one or more luminaires are also associated with the first profile and that a first DC power input and a second DC power input of the N other luminaires are respectively electrically coupled to the first DC power input and the second DC power input of the first luminaire; and
   controlling the first DC power supply to deliver N+1 times the first target power and the second DC power supply to deliver N+1 times the second target power;
   wherein N is a positive integer.

29. The lighting controller of claim 28, the method further comprising:
   determining that the first luminaire and the N other luminaires are serially coupled to the first DC power supply and to the second DC power supply; and
   setting voltages of the first DC power supply and the second DC power supply based on N.

30. The lighting controller of claim 28, the method further comprising:
   determining that the first luminaire and the N other luminaires are coupled in parallel to the first DC power supply and to the second DC power supply; and
   setting currents of the first DC power supply and the second DC power supply based on N.

31. The lighting controller of claim 25, the method further comprising:
   determining a first solar position for a first location of the first luminaire; and
   determining the target CCT based on the first solar position;
   wherein the solar position associated with the one or more luminaires comprises the first solar position.

32. The lighting controller of claim 25, the method further comprising:
   determining a first clock time for the first luminaire; and
   determining the target CCT based on the first clock time;
   wherein the clock time associated with the one or more luminaires comprises the first clock time.

33. The lighting controller of claim 25, the method further comprising:
   obtaining a target brightness for the one or more luminaires; and
   calculating the first target power and the second target power further based on the target brightness and the first profile, the first target power and the second target power calculated to drive the first luminaire to emit light at the target brightness with the target CCT.

34. The lighting controller of claim 25, the method further comprising:
   receiving a user control for the first luminaire from a user input device; and
   calculating the first target power and the second target power further based on the user control.

35. A lighting system comprising:
   one or more luminaires each comprising a first LED having a first spectral characteristic driven by a first direct-current (DC) power input and a second LED having a second spectral characteristic driven by a second DC power input;

a first DC power supply, separate from the one or more luminaires, electrically coupled to the first DC power input of a first luminaire of the one or more luminaires to drive the first LED of the first luminaire;

a second DC power supply, separate from the one or more luminaires, electrically coupled to the second DC power input of the first luminaire to drive the second LED of the first luminaire;

a lighting controller, communicatively coupled to the first DC power supply and the second DC power supply and separate from the one or more luminaires, the first DC power supply, and the second DC power supply, the lighting controller configured to:

obtain a target CCT for the one or more luminaires based on a solar position or a clock time associated with the one or more luminaires;

obtain a first profile for the one or more luminaires;

calculate a first target power for the first DC power input of the first luminaire and a second target power for a second DC power input of the first luminaire based on the target CCT and the first profile, the first target power and the second target power calculated to drive the first luminaire to emit light at the target CCT; and control the first DC power supply to deliver the first target power to the first DC power input of the first luminaire and the second DC power supply to deliver the second target power to the second DC power inputs of the first luminaire.

36. The lighting system of claim 35, wherein the first luminaire has no electrical power inputs other than the first DC power input and the second DC power input.

37. The lighting system of claim 35, wherein:

the first luminaire further comprises a third LED having a third spectral characteristic driven by a third DC power input;

the lighting system further comprises a third DC power supply, separate from the one or more luminaires, electrically coupled to the third DC power input of the first luminaire to drive the third LED of the first luminaire; and the lighting controller is further communicatively coupled to the third DC power supply and further configured to:

calculate a third target power for the third DC power input of the first luminaire, the first target power, the second target power, and the third target power calculated to drive the first luminaire to emit light at the target CCT; and control the third DC power supply to deliver the third target power to the third DC power input of the first luminaire.

38. The at least one non-transitory machine readable medium as claimed in claim 15, the method further comprising:

calculating a third target power for a third DC power input of the first luminaire, the first target power, the second target power, and the third target power calculated to drive the first luminaire to emit light at the target CCT; and control a third DC power supply to deliver the third target power to the third DC power input of the first luminaire.

* * * * *